(12) United States Patent
Fujishiro et al.

(10) Patent No.: US 10,028,331 B2
(45) Date of Patent: Jul. 17, 2018

(54) USER TERMINAL, COMMUNICATION CONTROL METHOD AND CHIPSET

(71) Applicant: KYOCERA CORPORATION, Kyoto-shi, Kyoto (JP)

(72) Inventors: Masato Fujishiro, Yokohama (JP); Chiharu Yamazaki, Ota-ku (JP); Hiroyuki Adachi, Kawasaki (JP); Yushi Nagasaka, Yokohama (JP); Kugo Morita, Yokohama (JP); Katsuhiro Mitsui, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/413,018

(22) Filed: Jan. 23, 2017

(65) Prior Publication Data

US 2017/0135151 A1 May 11, 2017

Related U.S. Application Data

(63) Continuation of application No. PCT/JP2015/070874, filed on Jul. 22, 2015.

(30) Foreign Application Priority Data

Jul. 24, 2014 (JP) ................................ 2014-150675
Nov. 27, 2014 (JP) ................................ 2014-240645

(51) Int. Cl.
*H04W 76/34* (2018.01)
*H04W 76/06* (2009.01)
(Continued)

(52) U.S. Cl.
CPC .......... *H04W 76/34* (2018.02); *H04L 45/245* (2013.01); *H04W 24/10* (2013.01);
(Continued)

(58) Field of Classification Search
CPC ... H04W 76/064; H04W 24/10; H04W 88/06; H04W 88/10; H04L 45/245
See application file for complete search history.

(56) References Cited

U.S. PATENT DOCUMENTS

2009/0080380 A1  3/2009  Chun et al.
2011/0267978 A1  11/2011 Etemad
(Continued)

FOREIGN PATENT DOCUMENTS

JP  10-327474 A    12/1998
JP  2007-049645 A   2/2007
(Continued)

OTHER PUBLICATIONS

LG Electronics Inc., "Open Issue Regarding Interworking Policy Evaluation", R2-142597, 3GPP TSG-RAN2 Meeting#86, May 19-23, 2014, 3 pages, 3GPP, Seoul, Republic of Korea.*
(Continued)

*Primary Examiner* — Nay A Maung
*Assistant Examiner* — Angelica M Perez

(57) ABSTRACT

A user terminal transmits and/or receives downlink traffic through cellular/WLAN aggregation by using a first communication and a second communication. The downlink traffic is divided into traffic for cellular communication network and traffic for WLAN. The user terminal further transmits an uplink control signal through the cellular/WLAN aggregation by using the first communication and without using the second communication. The user terminal further notifies the base station of a report regarding the second communication by the first communication. The report indicates a radio link failure in the second communication and includes a reason for the radio link failure. The reason includes a first reason and a second reason. The first reason relates to a radio environment in the second com-
(Continued)

munication. The second reason does not relate to the radio environment.

6 Claims, 18 Drawing Sheets

(51) Int. Cl.
  *H04W 24/10* (2009.01)
  *H04L 12/709* (2013.01)
  *H04W 88/06* (2009.01)
  *H04W 88/10* (2009.01)

(52) U.S. Cl.
  CPC .......... *H04W 76/064* (2013.01); *H04W 88/06* (2013.01); *H04W 88/10* (2013.01)

(56) References Cited

U.S. PATENT DOCUMENTS

| | | | |
|---|---|---|---|
| 2012/0135737 A1 | 5/2012 | Yoshihara et al. | |
| 2014/0079022 A1 | 3/2014 | Wang et al. | |
| 2015/0319641 A1 | 11/2015 | Uchino et al. | |

FOREIGN PATENT DOCUMENTS

| | | |
|---|---|---|
| JP | 2009-225127 A | 10/2009 |
| JP | 2010-538573 A | 12/2010 |
| JP | 2011-097154 A | 5/2011 |
| JP | 2012-015992 A | 1/2012 |
| WO | 2011/004828 A1 | 1/2011 |
| WO | 2013068787 A1 | 5/2013 |
| WO | 2014/103537 A1 | 7/2014 |

OTHER PUBLICATIONS

Alcatel-Lucent, Alcatel-Lucent Shangai Bell, "Discussion on the Remaining S-RLF issues in Dual Connectivity", R2-142567, 3GPP TSG RAN WG2 Meeting #86, May 19-23, 2014, 3 pages, Seoul, South Korea.*
Intel Corporation, "Idle mode procedures of WLAN/3GPP Radio Interworking for LTE", R2-142130, 3GPP TSG-RAN WG2 Meeting #86, May 19-23, 2014, 4 pages, 3GPP, Seooul, South Korea.
Intel Corporation, "Stage-2 details of WLAN/3GPP Radio Interworking for LTE", R2-142949, 3GPP TSG-RAN WG2 Meeting #86, May 19-23, 2014, 8 pages, 3GPP, Seoul, South Korea.
Qualcomm Incorporated, "Study Item proposal on E-UTRAN and WLAN Aggregation" RP-14xxxx, 3GPP TSG RAN Meeting #64, Jun. 10-13, 2014, 6 pages, 3GPP, Sophia Antipolis.
LG Electronics Inc., "Open issues regarding interworking policy evaluation", R2-142597, 3GPP TSG-RAN2 Meeting #86, May 19-23, 2014, 3 pages, 3GPP,Seoul, Republic of Korea.
Alcatel-Lucent et al., "Discussion on the remaining S-RLF issues in dual connectivity", R2-142567, 3GPP TSG RAN WG2 Meeting #86. May 19-23, 2014, 3 pages, 3GPP, Seoul, South Korea.
Ericsson et al, "WLAN/3GPP Radio Interworking—More on Idle and Connected mode solution", R2-131886, 3GPP TSG-RAN WG #82, May 20-24, 2013, 10 pages, 3GPP, Fukuoka, Japan.
Ericsson et al, "Way forward for WLAN/3GPP Radio interworking" R2-132827, 3GPP TSG-RAN WG2 #83, Aug. 19-23, 2013, 8 pages, 3GPP, Barcelona, Spain.
LG Electronics Inc., "Connectivity Models for Small Cell Enhancement", R2-130314, 8 pages, 3GPP TSG-RAN WG2 #81, Jan. 28-Feb. 1, 2013, 8 pages, 3GPP, St. Julian's, Malta.
LG Electronics, "RAN1 related issues for support of dual connectivity between macro cell and small cell", R1-131300, 3GPP TSG RAN WG1 #72bis. Apr. 15-19, 2013. 5 pages, 3GPP, Chicago, USA.
LG Electronics, "RAN1 issues for support of dual connectivity with small cell", R1-132240, 3GPP TSG RAN WG1 #73, May 20-24, 2013, 5 pages, 3GPP, Fukuoka, Japan.
Samsung, "UE Actions upon SCG RLF", R2-142222. 3GPP TSG-RAN WG2 Meeting #86, May 19-23, 2014, 3 pages, 3GPP, Seoul, South Korea.
NSN, Nokia Corp, "SeNB Failure Reporting", R2-142310, 3GPP TSG-RAN WG2 Meeting #86, May 19-23, 2014, 8 pages, 3GPP, Seoul, Korea.
Office Action issued for corresponding Japanese Patent Application No. JP2016-535959, dated Nov. 1, 2016.
International Search Report (Form PCT/ISA/210) issued for PCT/JP2015/070874, dated Sep. 8, 2015.
Written Opinion (Form PCT/ISA/237) issued for PCT/JP2015/070874, dated Sep. 8, 2015.
Extended European Search Report dated Jan. 26, 2018, issued in European Patent Application No. 15825581.0 by European Patent Office, 13 pages.

* cited by examiner

```
Collocated-WLAN-idPerPLMN-r13 ::=        SEQUENCE {
   Collocated-wlan-Identifiers           CHOICE {
      ssid                               OCTET STRING (SIZE (1..32)),
      bssid                              OCTET STRING (SIZE (6)),
      hessid                             OCTET STRING (SIZE (6))
   },
}
```

FIG. 11

```
WLAN-IdPerPLMN-r13 ::=          SEQUENCE {
    wlan-Identifiers           CHOICE {
        ssid                       OCTET STRING (SIZE (1..32)),
        bssid                      OCTET STRING (SIZE (6)),
        hessid                     OCTET STRING (SIZE (6))
    },
    Collocation-Indicator      {0,1}
}
```

FIG. 12

```
WLAN-IdPerPLMN-r13 ::=          SEQUENCE {
    wlan-Identifiers           CHOICE {
        ssid                       OCTET STRING (SIZE (1..32)),
        bssid                      OCTET STRING (SIZE (6)),
        hessid                     OCTET STRING (SIZE (6))
    },
    CellIdentity ::=               BIT STRING (SIZE (28))
}
```

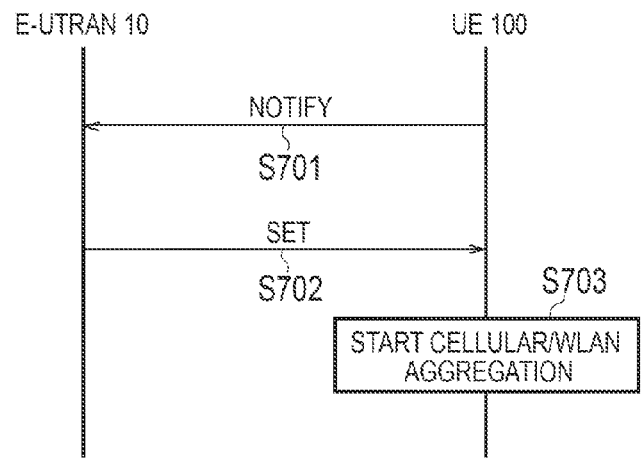
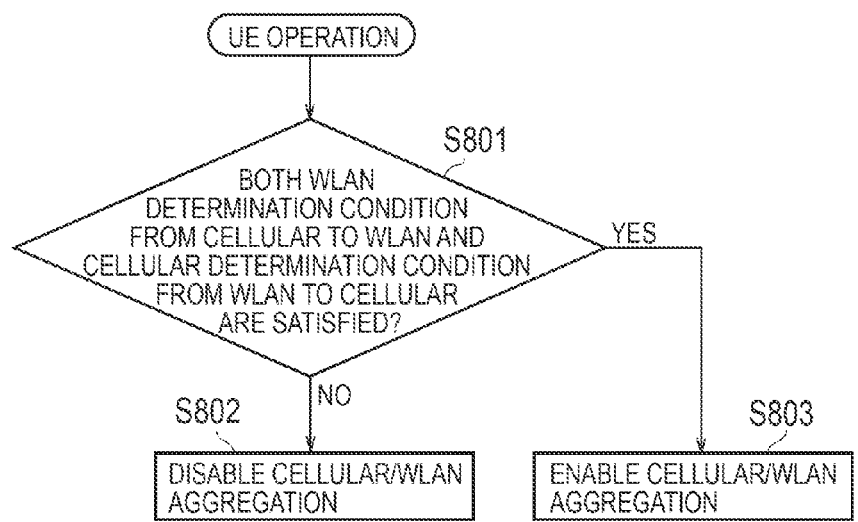

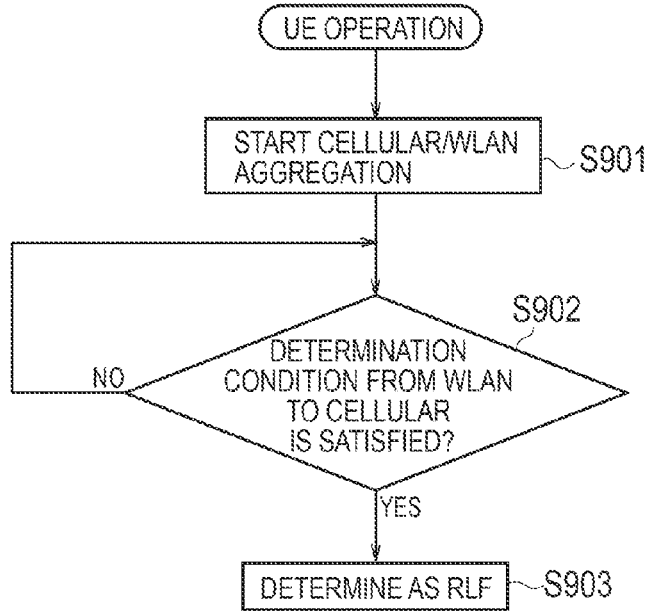
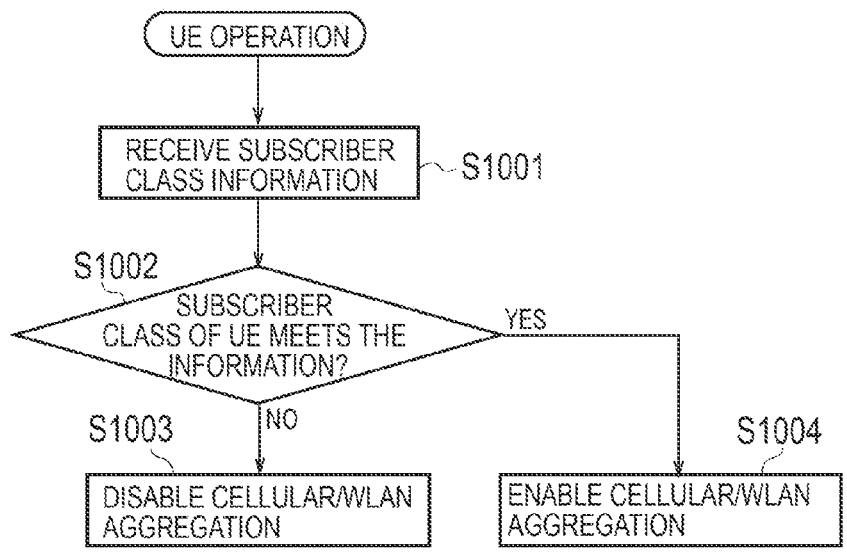

USER TERMINAL, COMMUNICATION CONTROL METHOD AND CHIPSET

RELATED APPLICATIONS

This application is a continuation application of international application PCT/JP2015/070874, filed Jul. 22, 2015, which claims benefit of Japanese Patent Application No. 2014-150675 (filed on Jul. 24, 2014) and Japanese Patent Application No. 2014-240645 (filed on Nov. 27, 2014), the entirety of all applications hereby expressly incorporated by reference.

TECHNICAL FIELD

The present application relates to a user terminal, communication control method and chipset that support a cellular/WLAN radio interworking technology.

BACKGROUND ART

An LTE (Long Term Evolution) of which the specifications are designed in 3GPP (3rd Generation Partnership Project), which is a project aiming to standardize a cellular communication technology, supports a cellular/WLAN radio interworking technology in Release 12 and later (see Non Patent Document 1 and 2).

With such a technology, a user terminal performs, on the basis of a determination condition regarding received power or reception quality of a cellular received signal and a determination condition regarding WLAN, terminal-initiated switching control to switch traffic of the user terminal between cellular communication and WLAN communication. The determination condition is determined by a threshold value (RAN assistance parameters) designated by a cellular network (RAN: Radio Access Network).

Further, in order to enhance the cellular/WLAN radio interworking technology, a technology is proposed by which traffic belonging to an identical data bearer is transmitted and received by using both the cellular communication and the WLAN communication (hereinafter, referred to as "cellular/WLAN aggregation") (see Non Patent Document 3).

PRIOR ART DOCUMENT

Non-Patent Document

Non Patent Document 1: 3GPP contribution "R2-142130"
Non Patent Document 2: 3GPP contribution "R2-142949"
Non Patent Document 3: 3GPP contribution "RP-140738"

SUMMARY OF THE INVENTION

A user terminal according to one embodiment comprises a first transceiver configured to communicate with a first layer in a base station by a first communication. The base station is included in a cellular communication network. The user terminal further comprises a second transceiver configured to communicate with an access point by a second communication. The access point is included in a Wireless Local Area Network (WLAN) and connected to the base station via a backhaul. The user terminal further comprises a controller configured to transmit and/or receive downlink traffic through cellular/WLAN aggregation by using the first communication and the second communication. The downlink traffic is divided into traffic for cellular communication network and traffic for WLAN at a second layer in the base station. The second layer is higher than the first layer. The controller is further configured to transmit an uplink control signal through the cellular/WLAN aggregation by using the first communication and without using the second communication. The first transceiver is further configured to notify the base station of a report regarding the second communication by the first communication. The report indicates a radio link failure in the second communication and includes a reason for the radio link failure. The reason includes a first reason and a second reason. The first reason relates to a radio environment in the second communication. The second reason does not relate to the radio environment.

A communication control method according to one embodiment comprises communicating with a first layer in a base station by a first communication. The base station included in a cellular communication network. The first communication notifies the base station of a report regarding a second communication. The communication control method further comprises communicating with an access point by the second communication. The access point is included in a Wireless Local Area Network (WLAN) and connected to the base station via a backhaul. The communication control method further comprises transmitting and/or receiving downlink traffic through cellular/WLAN aggregation by using the first communication and the second communication. The downlink traffic divided into traffic for cellular communication network and traffic for WLAN at a second layer in the base station. The communication control method further comprises transmitting an uplink control signal through the cellular/WLAN aggregation by using the first communication and without using the second communication. The report indicates a radio link failure in the second communication and includes a reason for the radio link failure. The reason includes a first reason and a second reason. The first reason relates to a radio environment in the second communication. The second reason does not relate to the radio environment.

BRIEF DESCRIPTION OF THE DRAWINGS

FIG. 11 is a diagram showing a second example of the designation method of the specific WLAN identifier.

FIG. 12 is a diagram showing a first modification of the first embodiment.

FIG. 21 is a diagram showing an operation according to the seventh embodiment.

FIG. 22 is a diagram showing an operation of the UE according to the eighth embodiment.

FIG. 23 is a diagram showing an operation of the UE according to the ninth embodiment.

FIG. 24 is a diagram showing an operation of the UE according to the tenth embodiment.

DESCRIPTION OF THE EMBODIMENT

[Overview of Embodiment]

Figure 1:
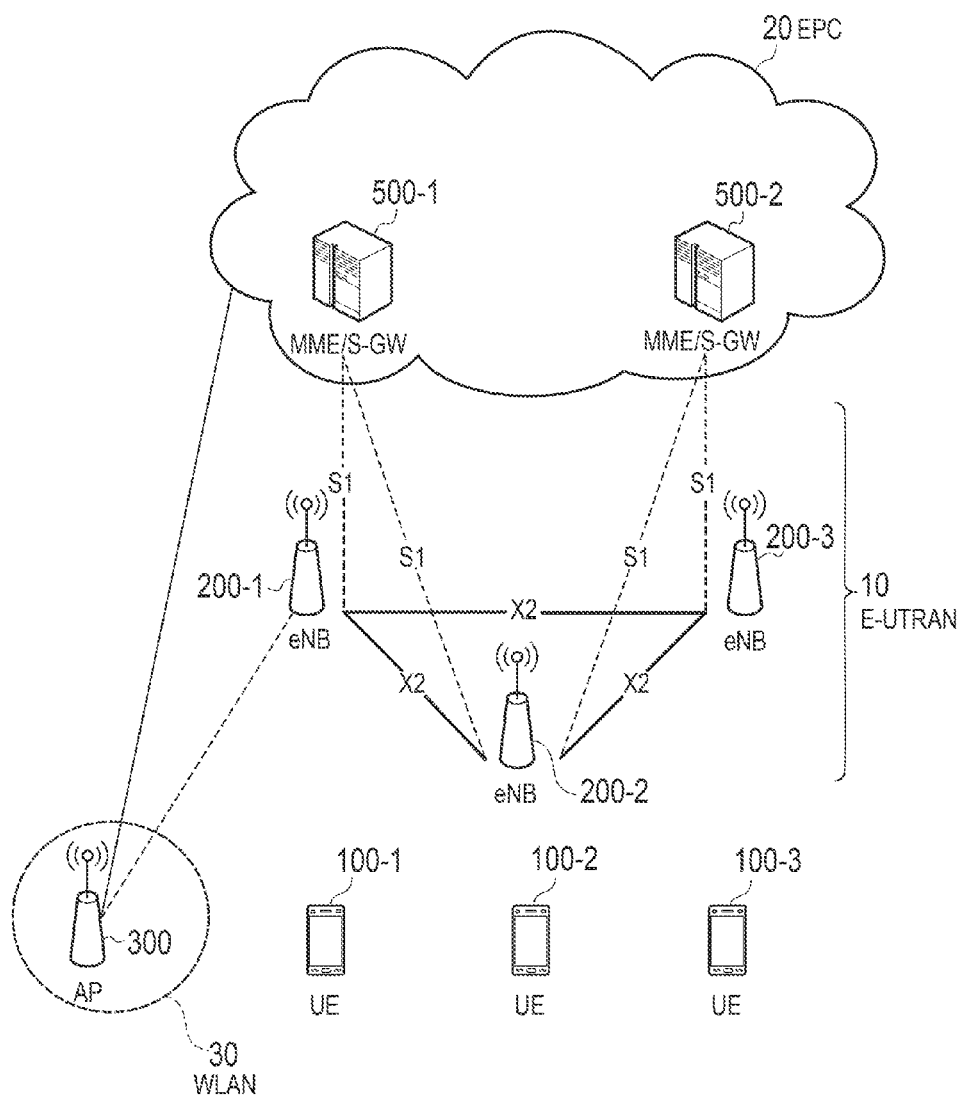
FIG. 1 is a diagram showing a system configuration according to a first embodiment through an eleventh embodiment.

A user terminal according to a first embodiment through an eleventh embodiment are described herein. An overview of each embodiment is described, starting with ninth embodiment. A user terminal according to the ninth embodiment supports cellular communication and WLAN communication. The user terminal comprises a controller configured to determine that a radio link failure in the WLAN communication occurs during an execution of cellular/WLAN aggregation by which traffic belonging to an identical data bearer or different data bearers is transmitted and received by using both the cellular communication and the WLAN communication.

In the ninth embodiment, the controller performs, on the basis of a predetermined determination condition, a switching determination regarding whether or not to switch from the WLAN communication to the cellular communication. When the predetermined determination condition is satisfied, the controller determines that the radio link failure in the WLAN communication occurs.

In the ninth embodiment, the controller transmits, to a base station, by the cellular communication, a radio link failure report regarding the radio link failure when determining that the radio link failure in the WLAN communication occurs.

In the ninth embodiment, the user terminal further comprises a transmitter configured to transmit, to a base station, by the cellular communication, a radio link failure report regarding the radio link failure when the controller determines that the radio link failure in the WLAN communication occurs.

In the ninth embodiment, the transmitter transmits the radio link failure report including, as a reason, at least any one of: an interference state of a frequency band in the WLAN communication; a failure in transmission and reception in the WLAN communication; a received strength of a radio signal from an access point performing the WLAN communication; and disconnection from the access point.

A base station according to the ninth embodiment is a cellular/WLAN collocated base station configured to support cellular communication and WLAN communication, or a base station configured to connect to an access point configured to support the WLAN communication to support the cellular communication. The base station comprises: a controller configured to control cellular/WLAN aggregation by which data belonging to an identical data bearer or different data bearers is transmitted and received by using both the cellular communication and the WLAN communication; and a receiver configured to receive, during control of the cellular/WLAN aggregation, from a user terminal configured to execute the cellular/WLAN aggregation or the access point, a radio link failure report indicating that a radio link failure in the WLAN communication occurs.

In the ninth embodiment, the controller performs, on the basis of the radio link failure report, control to transmit, to the access point or a node configured to control the access point, information for releasing a data bearer for the WLAN communication in the cellular/WLAN aggregation or information for changing a data bearer for the WLAN communication in the cellular/WLAN aggregation to another data bearer.

In the ninth embodiment, the radio link failure report includes information of at least any one of: a reason by which the radio link failure is determined to occur; and a most recent measurement result regarding the WLAN communication.

In the ninth embodiment, the base station further comprises a transmitter configured to transmit, to the access point or a node configured to control the access point, information indicating that the radio link failure in the WLAN communication occurs, when receiving the radio link failure report from the user terminal.

In the ninth embodiment, the base station further comprises a transmitter configured to transmit, to the access point, downlink data scheduled to be transmitted to the user terminal by the WLAN communication in the cellular/WLAN aggregation. The receiver receives, from the access point, on the basis of the radio link failure report, untransmitted downlink data from among the downlink data.

In the ninth embodiment, the controller performs, on the basis of the radio link failure report, control to transmit, to the access point, a transmission request of the untransmitted downlink data. The receiver receives the untransmitted downlink data from the access point that receives the transmission request.

In the ninth embodiment, when the controller has already deleted the downlink data transmitted to the access point, the controller performs control to transmit, to the access point or a node configured to control the access point, a transmission request of the untransmitted downlink data.

A user terminal according to a first embodiment supports cellular communication and WLAN communication. The user terminal comprises a controller configured to perform a switching determination regarding whether or not to switch from the cellular communication to the WLAN communication, on the basis of a first determination condition regarding a received power or a reception quality of a cellular received signal and a second determination condition regarding WLAN. When a specific WLAN identifier is designated to the controller from a cellular network, and when detecting a WLAN received signal including the specific WLAN identifier, the controller performs the switching determination on the basis of the second determination condition, without being based on the first determination condition.

In the first embodiment, the specific WLAN identifier is a WLAN identifier that is assigned to a cellular/WLAN collocated base station configured to support the cellular communication and the WLAN communication.

In the first embodiment, when a specific cell identifier that is assigned to a cellular/WLAN collocated base station configured to support the cellular communication and the WLAN communication is notified from the cellular network, and when a WLAN communication function of the user terminal is OFF, the controller sets the WLAN communication function to ON in response to a detection of a cellular received signal including the specific cell identifier.

A user terminal according to a second embodiment supports cellular communication and WLAN communication. The user terminal comprises: a controller configured to perform a switching determination regarding whether or not to switch from the cellular communication to the WLAN communication by comparing a received power or a reception quality of a cellular received signal with a threshold value designated from a cellular network. When the threshold value is designated for each WLAN identifier, the controller uses the threshold value corresponding to a WLAN identifier included in a WLAN received signal for the switching determination.

A base station according to the second embodiment manages a cell in which a user terminal exists that is configured to perform a switching determination regarding whether or not to switch from cellular communication to WLAN communication by comparing a received power or a reception quality of a cellular received signal with a threshold value designated from a cellular network. The base station comprises a controller configured to designate, for each WLAN identifier, the threshold value used for the switching determination.

A user terminal according to a third embodiment supports cellular communication and WLAN communication. The user terminal comprises a controller configured to perform a user terminal-initiated switching control to switch traffic of the user terminal between the cellular communication and the WLAN communication. When a specific WLAN identifier is designated from a cellular network, the controller disables the user terminal-initiated switching control for the specific WLAN identifier. The specific WLAN identifier is a WLAN identifier that is assigned to a node configured to support cellular/WLAN aggregation by which traffic belonging to an identical data bearer or different data bearers is transmitted and received by using both the cellular communication and the WLAN communication.

In the third embodiment, the specific WLAN identifier is included in a WLAN measurement command transmitted from the cellular network to the user terminal.

A user terminal according to a fourth embodiment supports cellular communication and WLAN communication. The user terminal comprises a controller configured to perform a user-terminal-initiated switching control to switch traffic of the user terminal between the cellular communication and the WLAN communication. The controller disables the user-terminal-initiated switching control when cellular/WLAN aggregation is executed by which traffic belonging to an identical data bearer or different data bearers is transmitted and received by using both the cellular communication and the WLAN communication.

A user terminal according to a fifth embodiment supports cellular communication and WLAN communication. The user terminal comprises a controller configured to execute cellular/WLAN aggregation by which traffic belonging to an identical data bearer or different data bearers is transmitted and received by using both the cellular communication and the WLAN communication. The controller includes a first entity in or below an MAC layer of the cellular communication, a second entity in or below an MAC layer of the WLAN communication, and a third entity in or above an RLC layer of the cellular communication. In the cellular/WLAN aggregation, the third entity transmits and receives a control signal to and from a base station via the first entity, not via the second entity.

A base station according to the fifth embodiment is a cellular/WLAN collocated base station configured to support cellular communication and WLAN communication. The base station comprises a controller configured to execute cellular/WLAN aggregation by which traffic belonging to an identical data bearer or different data bearers is transmitted and received by using both the cellular communication and the WLAN communication. The controller includes a first entity in or below an MAC layer of the cellular communication, a second entity in or below an MAC layer of the WLAN communication, and a third entity in or above an RLC layer of the cellular communication. In the cellular/WLAN aggregation, the third entity transmits and receives control signals to and from a user terminal via the first entity, not via the second entity.

A base station according to a sixth embodiment and other embodiments is connectable to a user terminal. The base station comprises: a controller configured to execute a communication scheme by which traffic belonging to an identical data bearer or different data bearers is transmitted and received by using both first communication between the base station and the user terminal, and second communication between another node connected to the base station via a direct interface and the user terminal; and a receiver configured to receive, from the user terminal, a buffer state report indicating an amount of untransmitted data of the user terminal. The controller decides, on the basis of the buffer state report, a ratio between a radio resource allocated to the user terminal in an uplink of the first communication and a radio resource allocated to the user terminal in an uplink of the second communication.

In the sixth embodiment, the communication scheme is cellular/WLAN aggregation by which the traffic is transmitted and received by using both cellular communication that is the first communication, and WLAN communication that is the second communication between an access point that is the another node and the user terminal.

In the other embodiments, the communication scheme is a dual connectivity scheme by which the traffic is transmitted and received by using both first cellular communication that is the first communication, and second cellular communication that is the second communication between another base station that is the another node and the user terminal.

A base station according to the sixth embodiment is a cellular/WLAN collocated base station configured to support cellular communication and WLAN communication. The base station comprises: a controller configured to execute cellular/WLAN aggregation by which traffic belonging to an identical data bearer or different data bearers is transmitted and received by using both the cellular communication and the WLAN communication; and a receiver configured to receive, from a user terminal, a buffer state report indicating an amount of untransmitted data of the user terminal. The controller decides, on the basis of the buffer state report, a ratio between a radio resource allocated to the user terminal in an uplink of the cellular communication and a radio resource allocated to the user terminal in an uplink of the WLAN communication.

A user terminal according to the sixth embodiment and the other embodiments is connectable to a base station. The user terminal comprises: a controller configured to execute a communication scheme by which traffic belonging to an identical data bearer or different data bearers is transmitted and received by using both first communication between the base station and the user terminal, and second communication between another node connected to the base station via a direct interface and the user terminal; a storage unit configured to have a second buffer configured to store untransmitted data in the second communication, a first buffer configured to store untransmitted data in the first communication; and a transmitter configured to transmit, on the basis of the first buffer and the second buffer, during an execution of the communication scheme, a buffer state report indicating an amount of untransmitted data to the base station.

In the sixth embodiment and the other embodiments, the transmitter transmits, to the base station, the buffer state report indicating the amount of untransmitted data in the first communication that is corrected in accordance with a ratio of an amount of transmission data in the uplink of the first communication to an amount of transmission data in the uplink of the first communication and the second communication.

In the sixth embodiment and the other embodiments, the transmitter transmits, to the base station, the buffer state report indicating the amount of untransmitted data in the first communication and the amount of untransmitted data in the second communication.

In the sixth embodiment, the communication scheme is cellular/WLAN aggregation by which the traffic is transmitted and received by using both cellular communication that is the first communication, and WLAN communication that is the second communication between an access point that is the another node and the user terminal.

In the other embodiments, the communication scheme is a dual connectivity scheme by which the traffic is transmitted and received by using both first cellular communication that is the first communication, and second cellular communication that is the second communication between another base station that is the another node and the user terminal.

A base station according to the sixth embodiment and the other embodiments is connectable to a user terminal. The base comprises: a controller configured to execute a communication scheme by which traffic belonging to an identical data bearer or different data bearers is transmitted and received by using both first communication between the base station and the user terminal, and second communication between another node connected to the base station via a direct interface and the user terminal; and a transmitter configured to transmit, to the user terminal, control information for setting an uplink transmission ratio that is a ratio between an amount of transmission data of the user terminal by the first communication, and an amount of transmission data of the user terminal by the second communication.

In the sixth embodiment and the other embodiments, the controller decides the uplink transmission ratio on the basis of information by which it is possible to estimate throughput of the access point.

In the sixth embodiment and the other embodiments, the transmitter transmits, to a user terminal capable of switching between a first mode for setting the uplink transmission ratio on the basis of the control information received from the base station and a second mode for autonomously setting the uplink transmission ratio, control information regarding a switching between the first mode and the second mode.

In the sixth embodiment, the communication scheme is cellular/WLAN aggregation by which the traffic is transmitted and received by using both cellular communication that is the first communication, and WLAN communication that is the second communication between an access point that is the another node and the user terminal.

In the sixth embodiment and the other embodiments, the communication scheme is a dual connectivity scheme by which the traffic is transmitted and received by using both first cellular communication that is the first communication, and second cellular communication that is the second communication between another base station that is the another node and the user terminal.

A user terminal according to the sixth embodiment and the other embodiments is connectable to a base station. The user terminal comprises a controller configured to execute a communication scheme by which traffic belonging to an identical data bearer or different data bearers is transmitted and received by using both first communication between the base station and the user terminal, and second communication between another node connected to the base station via a direct interface and the user terminal. The controller decides, during an execution of the communication scheme, a ratio between an amount of transmission data in an uplink of the first communication and an amount of transmission data in an uplink of the second communication, on the basis of the number of data units received successfully in a downlink of the first communication and the number of data units received successfully in a downlink of the second communication.

A base station according to the sixth embodiment and the other embodiments is connectable to a user terminal. The base station comprises a controller configured to execute a communication scheme by which traffic belonging to an identical data bearer or different data bearers is transmitted and received by using both first communication between the base station and the user terminal, and second communication between another node connected to the base station via a direct interface and the user terminal. When the user terminal is under an execution of the communication scheme, the controller decides a ratio between an amount of transmission data to the user terminal by the first communication and an amount of transmission data to the user terminal by the second communication, on the basis of the number of data units from the user terminal received successfully by the first communication and the number of data units from the user terminal received successfully by the second communication.

A user terminal according to a seventh embodiment supports cellular communication and WLAN communication. The user terminal comprises: a transmitter configured to transmit, to a base station, a notification indicating that QoS in the WLAN communication is not satisfied; and a controller configured to start, on the basis of a setting information transmitted from the base station in response to the notification, cellular/WLAN aggregation by which traffic belonging to an identical data bearer or different data bearers is transmitted and received by using both the cellular communication and the WLAN communication.

A user terminal according to an eighth embodiment supports cellular communication and WLAN communication. The user terminal comprises a controller configured to perform, on the basis of a first determination condition regarding cellular and a second determination condition regarding WLAN, a switching determination regarding whether or not to switch from the cellular communication to the WLAN communication. The controller performs, on the basis of a third determination condition regarding cellular and a fourth determination condition regarding WLAN, a switching determination regarding whether or not to switch from the WLAN communication to the cellular communication. When at least a part of the second determination condition and at least a part of the third determination condition are satisfied, the controller enables cellular/WLAN aggregation by which traffic belonging to an identical data bearer or different data bearers is transmitted and received by using both the cellular communication and the WLAN communication.

A user terminal according to a tenth embodiment supports cellular communication and WLAN communication. The user terminal comprises: a receiver configured to receive, from a cellular network, subscriber class information indicating a subscriber class to which cellular/WLAN aggregation by which traffic belonging to an identical data bearer or different data bearers is transmitted and received by using both the cellular communication and the WLAN communication, is permitted or prohibited; and a controller configured to determine, on the basis of the subscriber class information and a subscriber class of the user terminal, whether or not the cellular/WLAN aggregation is permitted.

A user terminal according to an eleventh embodiment supports cellular communication and WLAN communication. The user terminal comprises a controller configured to perform a user terminal-initiated switching control to switch traffic of the user terminal between the cellular communication and the WLAN communication. When a specific WLAN identifier is designated to the controller from a cellular network, and when switching to the WLAN communication corresponding to the specific WLAN identifier, the controller transmits a switching notification to a base station by the cellular communication. The specific WLAN identifier is a WLAN identifier that is assigned to a node configured to support cellular/WLAN aggregation by which traffic belonging to an identical data bearer or different data bearers is transmitted and received by using both the cellular communication and the WLAN communication.

[First Embodiment]

Below, with reference to the figure, an embodiment in which an LTE system is a cellular communication system configured in compliance with the 3GPP standards and which is linked with a wireless LAN (WLAN) system will be described.

(System Configuration)

FIG. 1 is a system configuration diagram according to a first embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network. The EPC 20 corresponds to a core network.

The E-UTRAN 10 corresponds to cellular RAN. The EPC 20 corresponds to a core network. The E-UTRAN 10 and the EPC 20 constitute a network of an LTE system.

The UE 100 is a mobile radio communication device. The UE 100 corresponds to a user terminal. The UE 100 is a terminal (dual terminal) that supports both a cellular communication scheme and a WLAN communication scheme.

The E-UTRAN 10 includes a plurality of eNBs 200 (evolved Node-Bs). The eNB 200 corresponds to a base station. The eNB 200 manages one or a plurality of cells and performs radio communication with the UE 100 which exists on the cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling.

The eNBs 200 are connected mutually via an X2 interface. Further, the eNB 200 is connected to MME (Mobility Management Entity)/S-GW (Serving-Gateway) 500 included in the EPC 20 via an S1 interface.

The EPC 20 includes a plurality of MMEs/S-GWs 500. The MME is a network node for performing various mobility controls, for example, for the UE 100, and corresponds to a controller. The S-GW is a network node that performs transfer control of user data and corresponds to a mobile exchange center.

A WLAN 30 includes a WLAN access point (hereinafter, referred to as "AP") 300. The AP 300 is an AP (Operator controlled AP) managed by a network operator of the LTE system, for example.

The WLAN 30 is configured to comply with standards of IEEE 802.11, for example. The AP 300 performs WLAN communication with the UE 100 in a frequency band different from a cellular frequency band. Generally, the WLAN communication is performed through an unlicensed band. The cellular communication is performed through a licensed band. The AP 300 is connected to the EPC 20 via a router, etc.

In addition to a case where the eNB 200 and the AP 300 are separate nodes, the eNB 200 and the AP 300 may be "Collocated" by regarding the eNB 200 and the AP 300 as the identical node. A configuration of an eNB 200 that is a cellular/WLAN collocated eNB 200 configured to support the cellular communication and the WLAN communication (hereinafter, referred to as a "cellular/WLAN collocated eNB 200") will be described later.

Alternatively, the eNB 200 and the AP 300 may be mutually connected via a direct interface.

The EPC 20 may further include an access network discovery and selection function (ANDSF) server. The ANDSF server manages ANDSF information related to the WLAN 30. The ANDSF server provides the UE 100 with the ANDSF information related to the WLAN 30.

Subsequently, a configuration of the UE 100, the eNB 200, and the AP 300 will be described.

Figure 2:
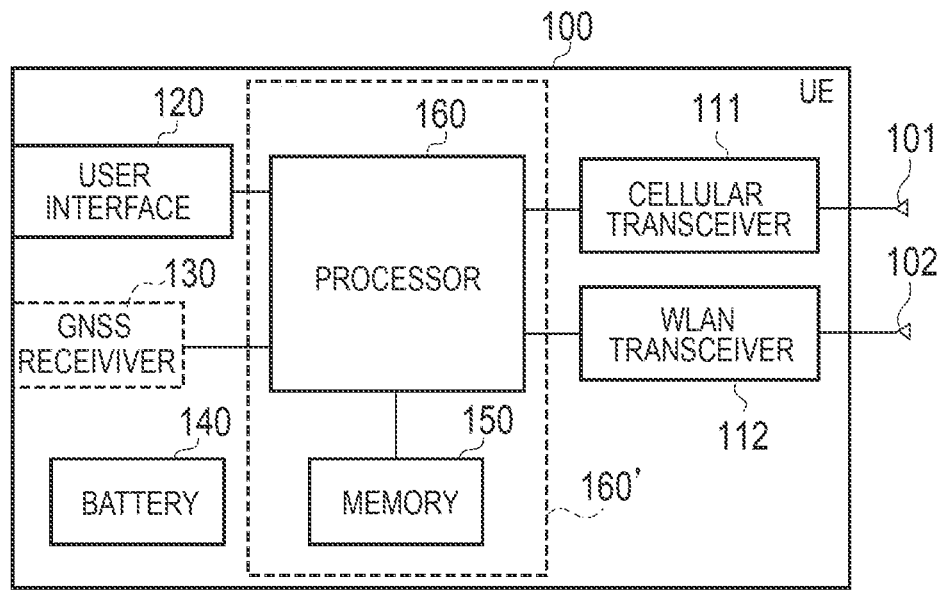
FIG. 2 is a block diagram of a UE according to the first embodiment through the eleventh embodiment.

FIG. 2 is a block diagram of the UE 100. As illustrated in FIG. 2, the UE 100 includes: antennas 101 and 102; a cellular transceiver 111; a WLAN transceiver 112; a user interface 120; a GNSS (Global Navigation Satellite System) receiver 130; a battery 140; a memory 150; and a processor 160. The memory 150 and the processor 160 constitute a controller. The UE 100 may not have the GNSS receiver 130 and the user interface 120. Furthermore, the memory 150 may be integrally formed with the processor 160, and this set (that is, a chipset) may be called a processor 160'.

The antenna 101 and the cellular transceiver 111 are used for transmitting and receiving cellular radio signals. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used to transmit and receive a WLAN radio signal. The WLAN transceiver 112 converts a baseband signal output from the processor 160 into a WLAN radio signal, and transmits the same from the antenna 102. Further, the WLAN transceiver 112 converts a WLAN radio signal received by the antenna 102 into a baseband signal, and outputs the same to the processor 160.

The user interface 120 is an interface for use by a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for processes by the processor 160. The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on audio and video signals. The processor 160 executes various processes and various communication protocols described later.

Figure 3:
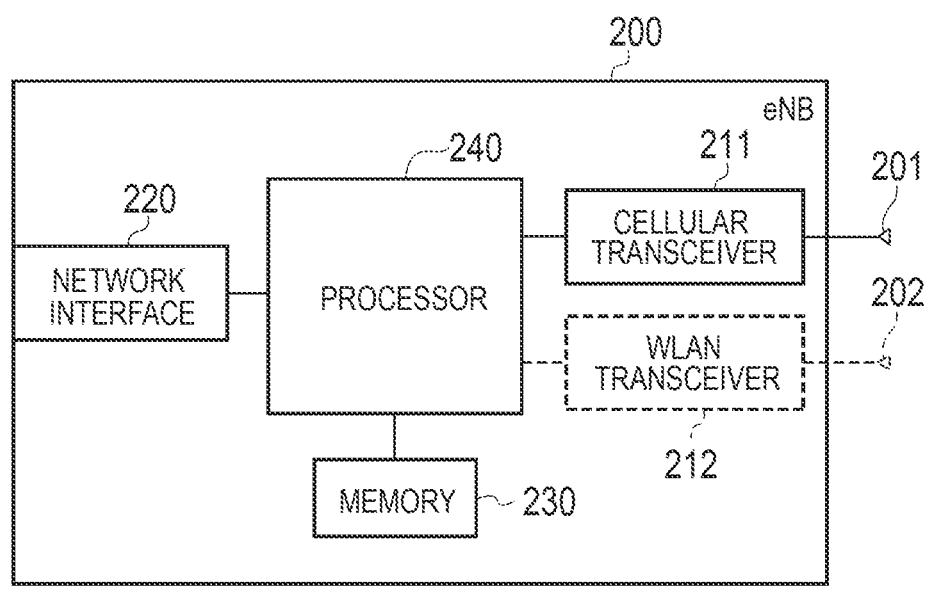
FIG. 3 is a block diagram of an eNB according to the first embodiment through the eleventh embodiment.

FIG. 3 is a block diagram of the eNB 200. As illustrated in FIG. 3, the eNB 200 includes an antenna 201, a cellular transceiver 211, a network interface 220, a memory 230, and a processor 240. The memory 230 and the processor 240 constitute a control unit. Furthermore, the memory 230 may be integrally formed with the processor 240, and this set (that is, a chipset) may be called a processor.

The antenna 201 and the cellular transceiver 211 are used for transmitting and receiving a cellular radio signal. The cellular transceiver 211 converts the baseband signal output from the processor 240 into the cellular radio signal, and transmits the same from the antenna 201. Furthermore, the cellular transceiver 211 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. The network interface 220 may be connected with the AP 300 via a direct interface.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various processes by executing the program stored in the memory 230. The processor 240 implements various processes and various communication protocols described later.

When the eNB 200 is a cellular/WLAN collocated eNB 200, the eNB 200 further includes an antenna 202 and a WLAN transceiver 212. The antenna 202 and the WLAN transceiver 212 are used to transmit and receive a WLAN radio signal. The WLAN transceiver 212 converts a baseband signal output from the processor 240 into a WLAN radio signal and transmits the same from the antenna 202. Further, the WLAN transceiver 212 converts a WLAN radio signal received by the antenna 202 into a baseband signal and outputs the same to the processor 240.

Figure 4:
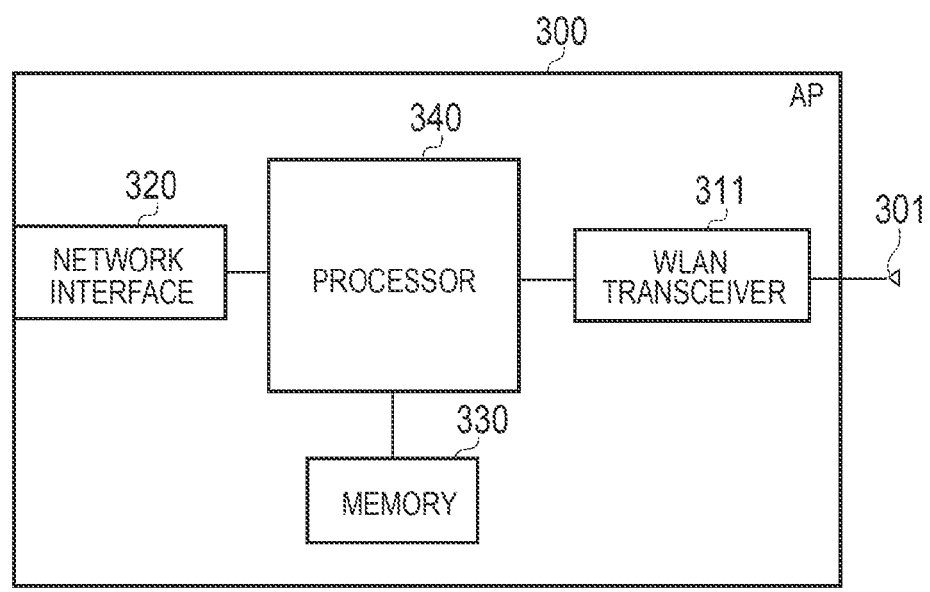
FIG. 4 is a block diagram of an AP according to the first embodiment through the eleventh embodiment.

FIG. 4 is a block diagram of the AP 300. As shown in FIG. 4, the AP 300 includes an antenna 301, a WLAN transceiver (WLAN communication unit) 311, a network interface 320, a memory 330, and a processor 340. The memory 330 may be integrally formed with the processor 340, and this set (that is, a chipset) may be called a processor.

The antenna 301 and the WLAN transceiver 311 are used to transmit and receive a WLAN radio signal. The WLAN transceiver 311 converts a baseband signal output from the processor 340 into a WLAN radio signal and transmits the same from the antenna 301. Further, the WLAN transceiver 311 converts a WLAN radio signal received by the antenna 301 into a baseband signal and outputs the same to the processor 340.

The network interface 320 is connected to the eNB 200 via a direct interface.

The memory 330 stores a program to be executed by the processor 340 and information to be used for a process by the processor 340. The processor 340 includes a baseband processor that performs modulation and demodulation, encoding and decoding and the like of a baseband signal, and a CPU that performs various processes by executing the program stored in the memory 330. The processor 340 executes various processes described later.

Figure 5:
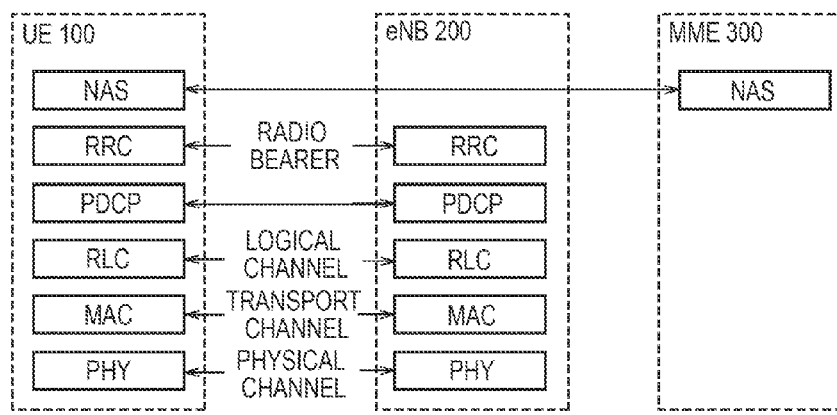
FIG. 5 is a protocol stack diagram of an LTE radio interface.

FIG. 5 is a protocol stack diagram of a radio interface in the LTE system. As shown in FIG. 5, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control signals are sent via a physical channel.

The MAC layer performs priority control of data, and a retransmission process and the like by a hybrid ARQ (HARQ). Between the MAC layer of the UE 100 and the MAC layer of the eNB 200, user data and control signals are sent via a transport channel. The MAC layer of the eNB 200 includes a scheduler for deciding a transport format (a transport block size and a modulation and coding scheme) of an uplink and a downlink, and a resource block to be assigned to the UE 100.

The RLC layer sends data to an RLC layer of a reception side by using the functions of the MAC layer and the physical layer. Between the RLC layer of the UE 100 and the RLC layer of the eNB 200, user data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (RRC message) for various types of settings is sent. The RRC layer controls the logical channel, the transport channel, and the physical channel according to the establishment, re-establishment, and release of a radio bearer. When a connection (RRC connection) is established between the RRC of the UE 100 and the RRC of the eNB 200, the UE 100 is in a RRC connected state, and when the connection is not established, the UE 100 is in an RRC idle state.

An NAS (Non-Access Stratum) layer positioned above the RRC layer performs session management, mobility management, and the like. The MME 300 transmits and receives NAS messages to and from the UE 100.

Moreover, in the LTE system, OFDMA (Orthogonal Frequency Division Multiple Access) is applied to a downlink, and SC-FDMA (Single Carrier Frequency Division Multiple Access) is applied to an uplink, respectively.

A radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Among radio resources allocated to the UE 100, a frequency resource can be designated by a resource block and a time resource can be designated by a subframe (or slot).

(Basic Operation of Terminal-Initiated Switching Control)

In 3GPP Release 12 and later, a cellular/WLAN radio interworking technology is supported (see Non Patent Document 1 and 2). With such a technology, the UE 100 in the RRC connected state or the RRC idle state performs a bidirectional traffic switching (traffic steering) between the E-UTRAN 10 and the WLAN 30.

The traffic switching is performed at the initiative of the UE 100 (UE based) by an aid of the E-UTRAN 10. Further, the traffic switching is performed in an APN (Access Point Name) unit. Hereinafter, such switching control is referred to as "UE-initiated switching control".

Figure 6:
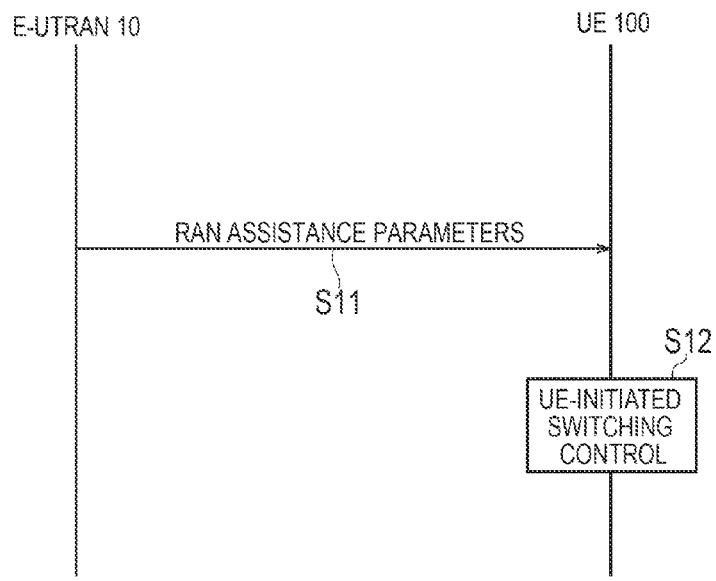
FIG. 6 is a diagram showing a basic operation of UE-initiated switching control according to the first embodiment through the eleventh embodiment.

FIG. 6 is a diagram showing a basic operation of UE-initiated switching control.

As shown in FIG. 6, in step S11, the E-UTRAN 10 transmits, to the UE 100, assistance information (RAN assistance parameters) by a broadcast RRC signaling or a dedicated RRC signaling. The broadcast RRC signaling, for example, is an SIB (System Information Block). The dedicated RRC signaling, for example, is an RRC Connection Reconfiguration message.

The assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The assistance information may include a WLAN identifier that is a target of the UE-initiated switching control. The WLAN identifier includes SSID, BSSID, HESSID, and the like. The assistance information may include a parameter that designates a period during which a threshold value (determination condition) should be satisfied.

The UE 100 configured to support the UE-initiated switching control receives the assistance information and stores the received assistance information. When performing a cell reselection or a handover, the UE 100 may discard the stored assistance information.

In step S12, the UE 100 performs the UE-initiated switching control.

First of all, an example of a switching from the cellular communication to the WLAN communication, that is, a switching from the E-UTRAN 10 to the WLAN 30 will be described. The UE 100 performs, on the basis of a first determination condition regarding the cellular and a second determination condition regarding the WLAN, a switching determination regarding whether or not to switch from the cellular communication to the WLAN communication. Specifically, when both the first determination condition and the second determination condition are satisfied, the UE 100 performs the switching from the cellular communication to the WLAN communication.

The first determination condition is the following conditions for an E-UTRAN serving cell:

$RSRPmeas < Thresh_{ServingOffloadWLAN, LowP}$; or $RSRQmeas < Thresh_{ServingOffloadWLAN, LowQ}$ Here, "RSRPmeas" is a received power of a cellular received signal, i.e., a reference signal received power (RSRP) measured at the UE 100. "RSRQmeas" is a reception quality of a cellular received signal, i.e., a reference signal reception quality (RSRQ) measured at the UE 100. "$Thresh_{ServingOffloadWLAN, LowP}$" and "$Thresh_{ServingOffloadWLAN, LowQ}$" are included in the assistance information, and are threshold values for switching to the WLAN 30.

The second determination condition is the following conditions for a target WLAN:

$ChannelUtilizationWLAN < Thresh_{ChUtilWLAN, Low}$; and $BackhaulRateDlWLAN > Thresh_{BackhRateDLWLAN, High}$; and $BackhaulRateUlWLAN > Thresh_{BackhRateULWLAN, High}$; and $BeaconRSSI > Thresh_{BeaconRSSIWLAN, High}$ Here, "ChannelUtilizationWLAN" is included in a WLAN beacon or a probe response, and indicates a WLAN channel usage rate, i.e., a WLAN radio load level. "BackhaulRateDlWLAN" and "BackhaulRateUlWLAN" are provided from an ANQP (Access Network Query Protocol), and indicate an available transmission rate of WLAN backhaul, i.e., a WLAN backhaul load level. "BeaconRSSI" indicates received signal intensity of a beacon signal measured at the UE 100. "$Thresh_{ChUtilWLAN, Low}$", "$Thresh_{BackhRateDLWLAN, High}$", "$Thresh_{BackhRateULWLAN, High}$", and "$Thresh_{BeaconRSSIWLAN, High}$" are included in the assistance information, and are threshold values for switching to the WLAN 30.

Next, an example of a switching from the WLAN communication to the cellular communication, that is, a switching from the WLAN 30 to the E-UTRAN 10 will be described. The UE 100 performs, on the basis of a third determination condition regarding the cellular and a fourth determination condition regarding the WLAN, a switching determination regarding whether or not to switch from the WLAN communication to the cellular communication. Specifically, when one of the third determination condition and the fourth determination condition is satisfied, the UE 100 performs the switching from the WLAN communication to the cellular communication.

The third determination condition is the following conditions for an E-UTRAN target cell:

$RSRPmeas > Thresh_{ServingOffloadWLAN, HighP}$; and $RSRQmeas > Thresh_{ServingOffloadWLAN, HighQ}$ Here, "$Thresh_{ServingOffloadWLAN, HighP}$" and "$Thresh_{ServingOffloadWLAN, HighQ}$" are included in the assistance information, and are threshold values for switching to the E-UTRAN 10.

The fourth determination condition is the following conditions for a source WLAN:

$ChannelUtilizationWLAN > Thresh_{ChUtilWLAN, High}$; or $BackhaulRateDlWLAN < Thresh_{BackhRateDLWLAN, Low}$; or $BackhaulRateUlWLAN < Thresh_{BackhRateULWLAN, Low}$; or $BeaconRSSI < Thresh_{BeaconRSSIWLAN, Low}$ Here, "Thresh$_{ChUtilWLAN, High}$", "Thresh$_{BackhRateDLWLAN, Low}$", "Thresh$_{BackhRateULWLAN, Low}$", and "Thresh$_{BeaconRSSIWLAN, Low}$" are included in the assistance information, and are threshold values for switching to the E-UTRAN 10.

(Basic Operation of Cellular/WLAN Aggregation)

In order to enhance the cellular/WLAN radio interworking technology, a technology is proposed by which traffic belonging to an identical data bearer is transmitted and received by using both the cellular communication and the WLAN communication (cellular/WLAN aggregation) (see Non Patent Document 3). This allows dynamic cellular/WLAN radio interworking, and thus it is possible to increase throughput. With such a technology, it is assumed to use a cellular/WLAN collocated eNB 200.

Figure 7:
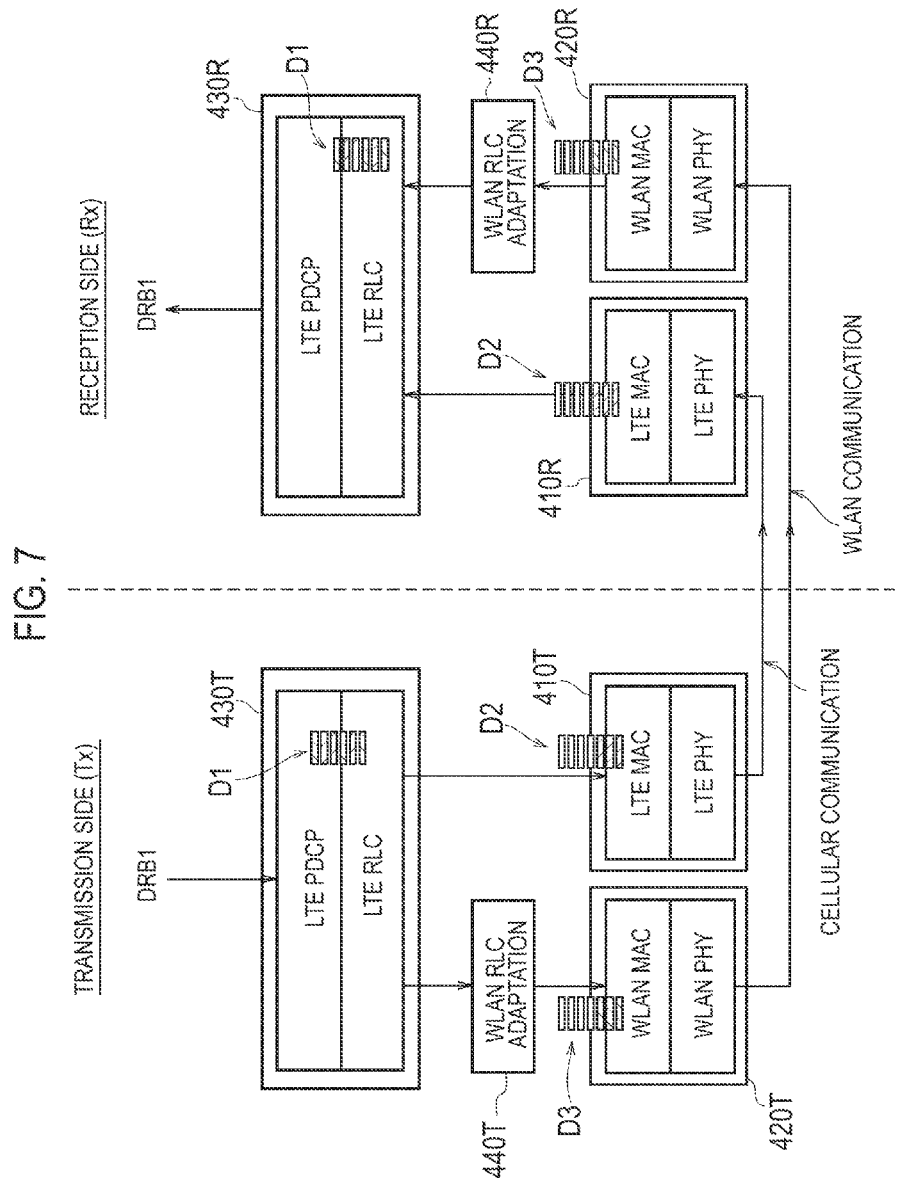
FIG. 7 is a diagram showing a basic operation of cellular/WLAN aggregation according to the first embodiment through the eleventh embodiment.

FIG. 7 is a diagram showing a basic operation of the cellular/WLAN aggregation. In FIG. 7, a transmission side (Tx) is one of the UE 100 and the cellular/WLAN collocated eNB 200. A reception side (Rx) is the other one of the UE 100 and the cellular/WLAN collocated eNB 200.

In the cellular/WLAN aggregation, the UE 100 includes a first entity 410T, R in or below the MAC layer of the cellular communication, a second entity 420T, R in or below the MAC layer of the WLAN communication, and a third entity 430 T, R in or above the RLC layer of the cellular communication. The third entity 430 T, R may include the RRC layer, in addition to the RLC layer and the PDCP layer. A fourth entity (WLAN RLC adaptation) 440 T, R configured to perform a protocol conversion between the WLAN MAC layer and an LTE RLC layer may be provided between the second entity 420 T, R and the third entity 430 T, R.

Similarly, in the cellular/WLAN aggregation, the cellular/WLAN collocated eNB 200 includes the first entity T, R in or below the MAC layer of the cellular communication, the second entity 420 T, R in or below the MAC layer of the WLAN communication, and the third entity 430 T, R in or above the RLC layer of the cellular communication. The third entity 430 T, R may include the RRC layer, in addition to the RLC layer and the PDCP layer. The fourth entity (WLAN RLC adaptation) 440 T, R configured to perform a protocol conversion between the WLAN MAC layer and the LTE RLC layer may be provided between the second entity 420 T, R and the third entity 430 T, R.

Next, by assuming the cellular/WLAN collocated eNB 200 as the transmission side, and the UE 100 as the reception side, a basic operation of the cellular/WLAN aggregation will be described. It is noted that in addition to such a downlink operation, an operation in reverse direction (uplink operation) may be performed.

As shown in FIG. 7, in the cellular/WLAN collocated eNB 200 of a transmission side, a third entity 430T processes a traffic (user data) D1 belonging to a data bearer (DRB1: Data Radio Bearer 1). Then, the third entity 430T provides a first entity 410T with a part of the traffic D1, and provides a second entity 420T with the remaining of the traffic D1. The first entity 410T processes traffic D2 provided by the third entity 430T, and transmits the traffic D2 by the cellular communication. On the other hand, the second entity 420T processes traffic D3 provided by the third entity 430T, and transmits the traffic D3 by the WLAN communication.

In the UE 100 of a reception side, a first entity 410R receives the traffic D2 by the cellular communication, and processes the traffic D2 to provide the same to a third entity 430R. On the other hand, a second entity 420R receives the traffic D3 by the WLAN communication, and processes the traffic D3 to provide the same to the third entity 430R. The third entity 430R reconfigures the traffic D1 from the traffic D2 provided by the first entity 410R and the traffic D3 provided by the second entity 420R, and processes the traffic D1 to provide the same to an upper layer (application layer, etc.).

An example in which only the cellular/WLAN collocated eNB 200 from among eNBs 200 supports the cellular/WLAN aggregation, will be mainly described below. However, the cellular/WLAN aggregation may be supported by a combination of the eNB 200 and the AP 300 by connecting the eNB 200 and the AP 300, that are different nodes, via a direct interface.

Further, another example of the cellular/WLAN aggregation will be described in Other Embodiments.

(Operation Environment)

Figures 8, 9:
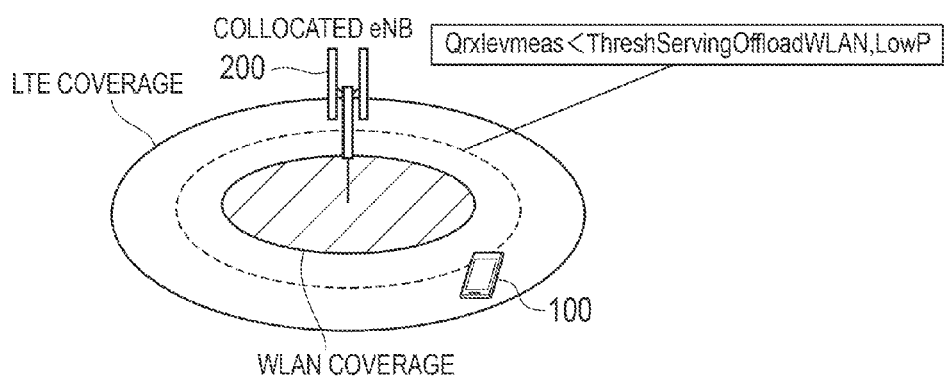
FIG. 8 is a diagram showing an operation environment according to the first embodiment through the eleventh embodiment.
FIG. 9 is a diagram showing a first example of a designation method of a specific WLAN identifier.

FIG. 8 is a diagram showing an operation environment according to the first embodiment.

As shown in FIG. 8, the cellular/WLAN collocated eNB 200 forms an LTE coverage area and a WLAN coverage area. The LTE coverage area has a coverage size corresponding to a small cell. The small cell may be a femto cell or a pico cell. The LTE coverage area is wider than the WLAN coverage area.

The UE 100 is located out of the WLAN coverage area and within the LTE coverage area. The UE 100 selects a cell of a NB 200 as a serving cell. The UE 100 performs the above-described UE-initiated switching control.

Here, in the switching determination regarding whether or not to switch from the cellular communication to the WLAN communication, the UE 100 does not switch from the cellular communication to the WLAN communication unless the first determination condition is satisfied. The first determination condition indicates that the radio state of the cellular communication is not good.

The inside of a circle indicated by a dashed line of FIG. 8 is a region in which the radio state of the cellular communication is good, that is, a region in which the first determination condition is not satisfied. The WLAN coverage area exists inside the circle indicated by a dashed line of FIG. 8. As a result, it is difficult to satisfy the first determination condition in the WLAN coverage area, and thus, the WLAN of the cellular/WLAN collocated eNB 200 will hardly be used. Therefore, in the first embodiment, the problem described above is resolved by the following operations.

(Operation According to First Embodiment)

A specific WLAN identifier is designated to the UE 100 from a cellular network, and when detecting a WLAN received signal including the specific WLAN identifier, the UE 100 performs a switching determination on the basis of the second determination condition, without being based on the first determination condition. In the first embodiment, the specific WLAN identifier is a WLAN identifier assigned to the cellular/WLAN collocated eNB 200.

The specific WLAN identifier may be included in the above-described assistance information (broadcast RRC signaling or dedicated RRC signaling). Alternatively, the specific WLAN identifier may be provided by an ANDSF server.

An example of designating a specific WLAN identifier by a broadcast RRC signaling or dedicated RRC signaling will be described below. In this case, it is preferable that the UE 100 preferentially apply the dedicated RRC signaling rather than the broadcast RRC signaling.

The broadcast RRC signaling or the dedicated RRC signaling may be transmitted by the cellular/WLAN collocated eNB 200. Alternatively, the broadcast RRC signaling or the dedicated RRC signaling may be transmitted by another eNB 200 configured to manage a cell of which at least a part overlaps with the cellular/WLAN collocated eNB 200.

FIG. 9 is a diagram showing a first example of a designation method of a specific WLAN identifier. As shown in FIG. 9, the cellular network provides the UE 100 with a list of the specific WLAN identifiers. In the first embodiment, the list includes a WLAN identifier assigned to the cellular/WLAN collocated eNB 200. The UE 100 receives a specific WLAN identifier transmitted by the broadcast RRC signaling or the dedicated RRC signaling, and stores the received specific WLAN identifier.

Figure 10:
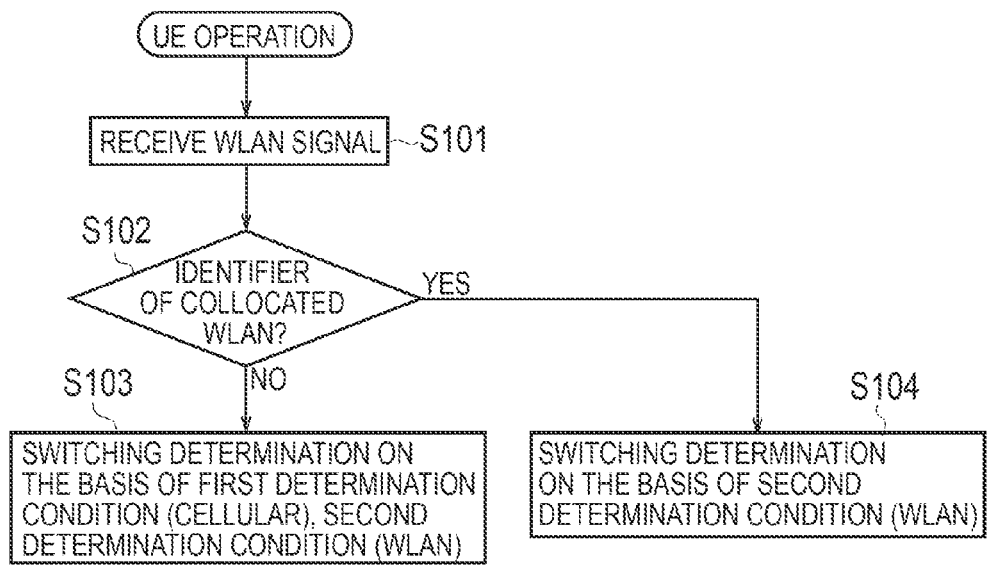
FIG. 10 is a diagram showing an operation of the UE according to the first embodiment.

FIG. 10 is a diagram showing an operation of the UE 100 according to the first embodiment. Here, it is assumed that the UE 100 has already stored the specific WLAN identifier.

As shown in FIG. 10, in step S101, the UE 100 receives a WLAN signal. The WLAN signal is a WLAN beacon or a probe response, etc.

In step S102, the UE 100 confirms whether or not a WLAN identifier included in a WLAN received signal is a specific WLAN identifier.

When the WLAN identifier included in the WLAN received signal is not a specific WLAN identifier, in step S103, the UE 100 performs, on the basis of both the first determination condition and the second determination condition, a switching determination from the cellular communication to the WLAN communication.

On the other hand, when the WLAN identifier included in the WLAN received signal is a specific WLAN identifier, in step S104, the UE 100 performs the switching determination from the cellular communication to the WLAN communication, on the basis of the second determination condition, without being based on the first determination condition. That is, the UE 100 performs the switching determination without applying the first determination condition.

Such an operation will be described by using the operation environment of FIG. 8 as an example. A case in which the UE 100 storing a specific WLAN identifier moves to the WLAN coverage area, is assumed.

The UE 100 receives, in the WLAN coverage area, a WLAN radio signal including a specific WLAN identifier. The UE 100 detects a WLAN received signal including the specific WLAN identifier, and performs a switching determination from the cellular communication to the WLAN communication. The UE 100 performs the switching determination on the basis of the second determination condition, without being based on the first determination condition. As a result, it becomes easier to use the WLAN of the cellular/WLAN collocated eNB 200.

FIG. 11 is a diagram showing a second example of the designation method of a specific WLAN identifier.

As shown in FIG. 11, the cellular network provides the UE 100 with a list of the WLAN identifiers and a flag indicating that the WLAN identifier is the specific WLAN identifier. The flag is 1-bit information (Collocation-Indicator), for example.

[First Modification of First Embodiment]

FIG. 12 is a diagram showing a first modification of the first embodiment.

As shown in FIG. 12, when providing the UE 100 with a WLAN identifier assigned to the cellular/WLAN collocated eNB 200, the cellular network provides the UE 100 with a cell identifier (specific cell identifier) assigned to the cellular/WLAN collocated eNB 200. The cell identifier is a Physical Cell Identifier (PCI). Alternatively, the cell identifier may be an EUTRAN Cell Global Identifier (ECGI).

For example, another eNB 200 configured to manage a cell of which at least a part overlaps with the cellular/WLAN collocated eNB 200 performs notification of the specific cell identifier by the broadcast RRC signaling or the dedicated RRC signaling. The UE 100 has been notified of the specific cell identifier assigned to the cellular/WLAN collocated eNB 200 from the cellular network, and when a WLAN communication function of the UE 100 is OFF, the UE 100 sets the WLAN communication function to ON in response to the detection of a cellular received signal including the specific cell identifier.

Such an operation will be described by using the operation environment of FIG. 8 as an example. A case in which the UE 100 storing a specific cell identifier moves to the LTE coverage area, is assumed. The UE 100 receives, in the LTE coverage area, a cellular radio signal including a specific cell identifier. The UE 100 detects a cellular received signal including the specific cell identifier, and switches a WLAN communication function of the UE 100 from OFF to ON. As a result, it becomes easier to use the WLAN of the cellular/WLAN collocated eNB 200.

[Second Modification of First Embodiment]

In the above-described first embodiment, as the specific WLAN identifier, a WLAN identifier assigned to the cellular/WLAN collocated eNB 200 is illustrated.

However, the specific WLAN identifier may be a WLAN identifier assigned to an AP 300 adjacent to the eNB 200. "Adjacent to the eNB 200" indicates a range inside the circle indicated by a dashed line of FIG. 8, for example.

According to the present modification, it becomes easier to use the AP 300 adjacent to the eNB 200.

[Second Embodiment]

Next, a second embodiment will be described. A system configuration, a basic operation of a UE-initiated switching control, a basic operation of cellular/WLAN aggregation, and an operation environment according to the second embodiment is similar to those of the first embodiment.

Hereinafter, an operation according to the second embodiment will be described while focusing on the differences from the operation according to the first embodiment.

In the second embodiment, the cellular network (the eNB 200 or the ANDSF server) designates a threshold value used for a switching determination for each WLAN identifier. For example, the eNB 200 transmits a plurality of WLAN identifiers and a plurality of threshold values constituting of threshold values corresponding to each of the plurality of WLAN identifiers, by the broadcast RRC signaling or the dedicated RRC signaling.

The broadcast RRC signaling or the dedicated RRC signaling may be transmitted by the cellular/WLAN collocated eNB 200. Alternatively, the broadcast RRC signaling or the dedicated RRC signaling may be transmitted by another eNB 200 configured to manage a cell of which at least a part overlaps with the cellular/WLAN collocated eNB 200.

The UE 100 receives threshold values for each WLAN identifier, and stores the threshold values of each WLAN identifier. When a threshold value is designated for each WLAN identifier, the UE 100 uses the threshold value corresponding to the WLAN identifier included in the WLAN received signal for the switching determination.

Figure 13:
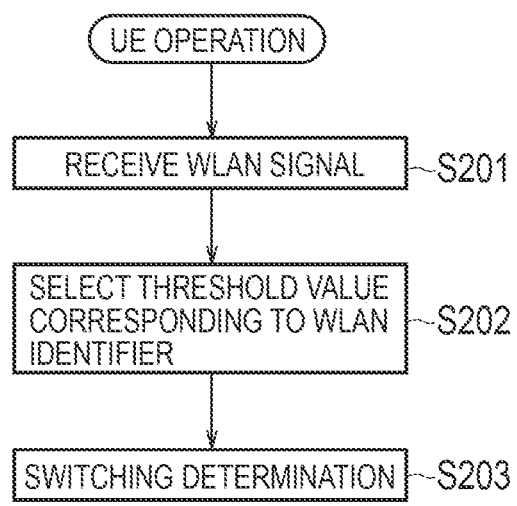
FIG. 13 is a diagram showing an operation of the UE according to the second embodiment.

FIG. 13 is a diagram showing an operation of the UE 100 according to the second embodiment. Here, it is assumed that the UE 100 stores a threshold value for each WLAN identifier. Further, as a threshold value, "$Thresh_{ServingOffloadWLAN,\ LowP}$" and "$Thresh_{ServingOffloadWLAN,\ LowQ}$" in the first determination condition are assumed.

As shown in FIG. 13, in step S201, the UE 100 receives a WLAN signal. The WLAN signal is a WLAN beacon or a probe response, etc.

In step S202, the UE 100 selects "$Thresh_{ServingOffloadWLAN,\ LowP}$" and "$Thresh_{ServingOffloadWLAN,\ LowQ}$" corresponding to the WLAN identifier included in the WLAN received signal, from among "$Thresh_{ServingOffloadWLAN,\ LowP}$" and "$Thresh_{ServingOffloadWLAN,\ LowQ}$" stored for each WLAN identifier.

In step S203, the UE 100 performs, on the basis of the first determination condition and the second determination condition, a switching determination from the cellular communication to the WLAN communication. Here, for the first determination condition, "$Thresh_{ServingOffloadWLAN,\ LowP}$" and "$Thresh_{ServingOffloadWLAN,\ LowQ}$" selected in step S202 are used.

Such an operation will be described by using the operation environment of FIG. 8 as an example. The cellular network sets "$Thresh_{ServingOffloadWLAN,\ LowP}$" and "$Thresh_{ServingOffloadWLAN,\ LowQ}$" corresponding to the WLAN identifier (specific WLAN identifier) assigned to the cellular/WLAN collocated eNB 200 to be sufficiently large as compared to other WLAN identifiers. This means that the circle indicated by a dashed line of FIG. 8 becomes smaller, and thus, it becomes easier to use the WLAN of the cellular/WLAN collocated eNB 200.

Further, setting "$Thresh_{ServingOffloadWLAN,\ LowP}$" corresponding to the specific WLAN identifier to an RSRP maximum value, and "$Thresh_{ServingOffloadWLAN,\ LowQ}$" corresponding to the specific WLAN identifier to an RSRQ maximum value makes the UE 100 perform a switching determination from the cellular communication to the WLAN communication without substantially applying the first determination condition. As a result, it becomes easier to use the WLAN of the cellular/WLAN collocated eNB 200.

[First Modification of Second Embodiment]

In the above-described second embodiment, the cellular network directly designates a threshold value used for a switching determination for each WLAN identifier. However, the cellular network may indirectly designate a threshold value used for a switching determination for each WLAN identifier.

In the present modification, the cellular network designates an offset value related to a threshold value used for a switching determination for each WLAN identifier. For example, a positive offset value is designated for setting "$Thresh_{ServingOffloadWLAN,\ LowP}$" and "$Thresh_{ServingOffloadWLAN,\ LowQ}$" corresponding to the WLAN identifier (specific WLAN identifier) assigned to the cellular/WLAN collocated eNB 200 to be sufficiently large (or may be set to Infinity) as compared to other WLAN identifiers.

When the WLAN identifier included in the WLAN received signal is the specific WLAN identifier, the UE 100 sets "$Thresh_{ServingOffloadWLAN,\ LowP}$" and "$Thresh_{ServingOffloadWLAN,\ LowQ}$" to be large by applying the offset value corresponding to the specific WLAN identifier. This means that the circle indicated by a dashed line of FIG. 8 becomes smaller, and thus, it becomes easier to use the WLAN of the cellular/WLAN collocated eNB 200.

[Second Modification of Second Embodiment]

In the above-described second embodiment and the first modification thereof, as a specific WLAN identifier, a WLAN identifier assigned to the cellular/WLAN collocated eNB 200 is illustrated.

However, the specific WLAN identifier may be a WLAN identifier assigned to the AP 300 adjacent to the eNB 200. According to the present modification, it becomes easier to use the AP 300 adjacent to the eNB 200.

[Third Embodiment]

Next, a third embodiment will be described. A system configuration, a basic operation of a UE-initiated switching control, a basic operation of cellular/WLAN aggregation, and an operation environment according to the third embodiment are similar to those of the first embodiment.

Hereinafter, an operation according to the third embodiment will be described while focusing on the differences from the operations according to the first and second embodiments.

As described above, in the UE-initiated switching control, a traffic switching is performed at an APN unit. On the other hand, in the cellular/WLAN aggregation, it is possible to transmit and receive traffic belonging to the identical data bearer by using both the cellular communication and the WLAN communication. Further, it is assumed that the control of the cellular/WLAN aggregation is performed by an initiative of the eNB 200. Therefore, it is not preferable to switch all traffic by an initiative of the UE, for a node supporting the cellular/WLAN aggregation. Here, a node supporting the cellular/WLAN aggregation is the cellular/WLAN collocated eNB 200 or the AP 300 directly connected to the eNB 200.

In the third embodiment, when the specific WLAN identifier is designated from the cellular network (the eNB 200 or the ANDSF server), the UE 100 disables the UE-initiated switching control for the specific WLAN identifier. The specific WLAN identifier is a WLAN identifier assigned to the node supporting the cellular/WLAN aggregation.

For example, the eNB 200 transmits, to the UE 100, a list of the specific WLAN identifiers by the broadcast RRC signaling or the dedicated RRC signaling. For a designation method of a specific WLAN identifier, the method shown in FIG. 9 may be used, or the method shown in FIG. 11 may be used. Further, the dedicated RRC signaling may be a WLAN measurement command for setting a WLAN measurement. In this case, the specific WLAN identifier is included in the WLAN measurement command.

Figure 14:
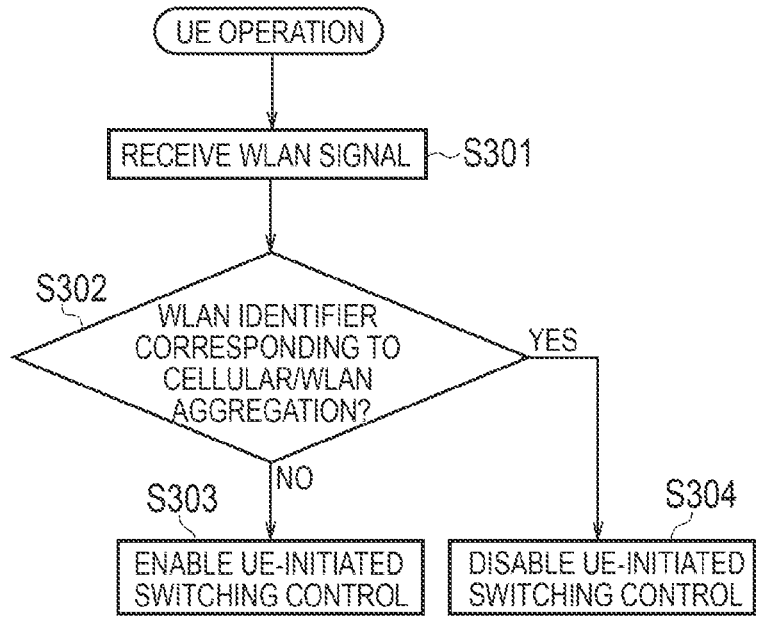
FIG. 14 is a diagram showing an operation of the UE according to the third embodiment.

FIG. 14 is a diagram showing an operation of the UE 100 according to the third embodiment. Here, it is assumed that the UE 100 has already stored the specific WLAN identifier.

As shown in FIG. 14, in step S301, the UE 100 receives a WLAN signal. The WLAN signal is a WLAN beacon or a probe response, etc.

In step S302, the UE 100 confirms whether or not a WLAN identifier included in a WLAN received signal is the specific WLAN identifier.

When the WLAN identifier included in the WLAN received signal is not the specific WLAN identifier, in step S303, the UE 100 enables the UE-initiated switching control and performs the switching determination from the cellular communication to the WLAN communication.

On the other hand, when the WLAN identifier included in the WLAN received signal is the specific WLAN identifier, in step S304, the UE 100 disables the UE-initiated switching control and does not perform the switching determination from the cellular communication to the WLAN communication.

[Fourth Embodiment]

Next, a fourth embodiment will be described. A system configuration, a basic operation of a UE-initiated switching control, a basic operation of cellular/WLAN aggregation, and an operation environment according to the fourth embodiment are similar to those of the first embodiment.

Hereinafter, an operation according to the fourth embodiment will be described while focusing on the differences from the operations according to the first to third embodiments.

In the above-described third embodiment, a case in which the cellular/WLAN aggregation has not been started, is assumed. However, it is not preferable that the UE-initiated switching control is performed even during the execution of the cellular/WLAN aggregation.

Therefore, in the fourth embodiment, the UE 100 disables the UE-initiated switching control when the cellular/WLAN aggregation is being executed. For example, the UE 100 disables the UE-initiated switching control by ignoring the above-described assistance information.

Figure 15:
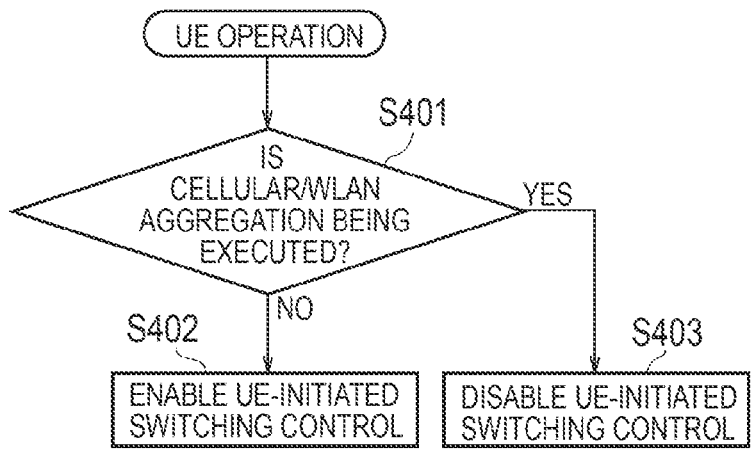
FIG. 15 is a diagram showing an operation of the UE according to the fourth embodiment.

FIG. 15 is a diagram showing an operation of the UE 100 according to the fourth embodiment.

As shown in FIG. 15, in step S401, the UE 100 confirms whether or not the cellular/WLAN aggregation is being executed.

When the cellular/WLAN aggregation is not being executed, in step S402, the UE 100 enables the UE-initiated switching control.

On the other hand, when the cellular/WLAN aggregation is being executed, in step S403, the UE 100 disables the UE-initiated switching control.

[Fifth Embodiment]

Next, a fifth embodiment will be described. A system configuration, a basic operation of a UE-initiated switching control, a basic operation of cellular/WLAN aggregation, and an operation environment according to the fifth embodiment are similar to those of the first embodiment.

Hereinafter, an operation according to the fifth embodiment will be described while focusing on the differences from the operations according to the first to fourth embodiments.

Figure 16:
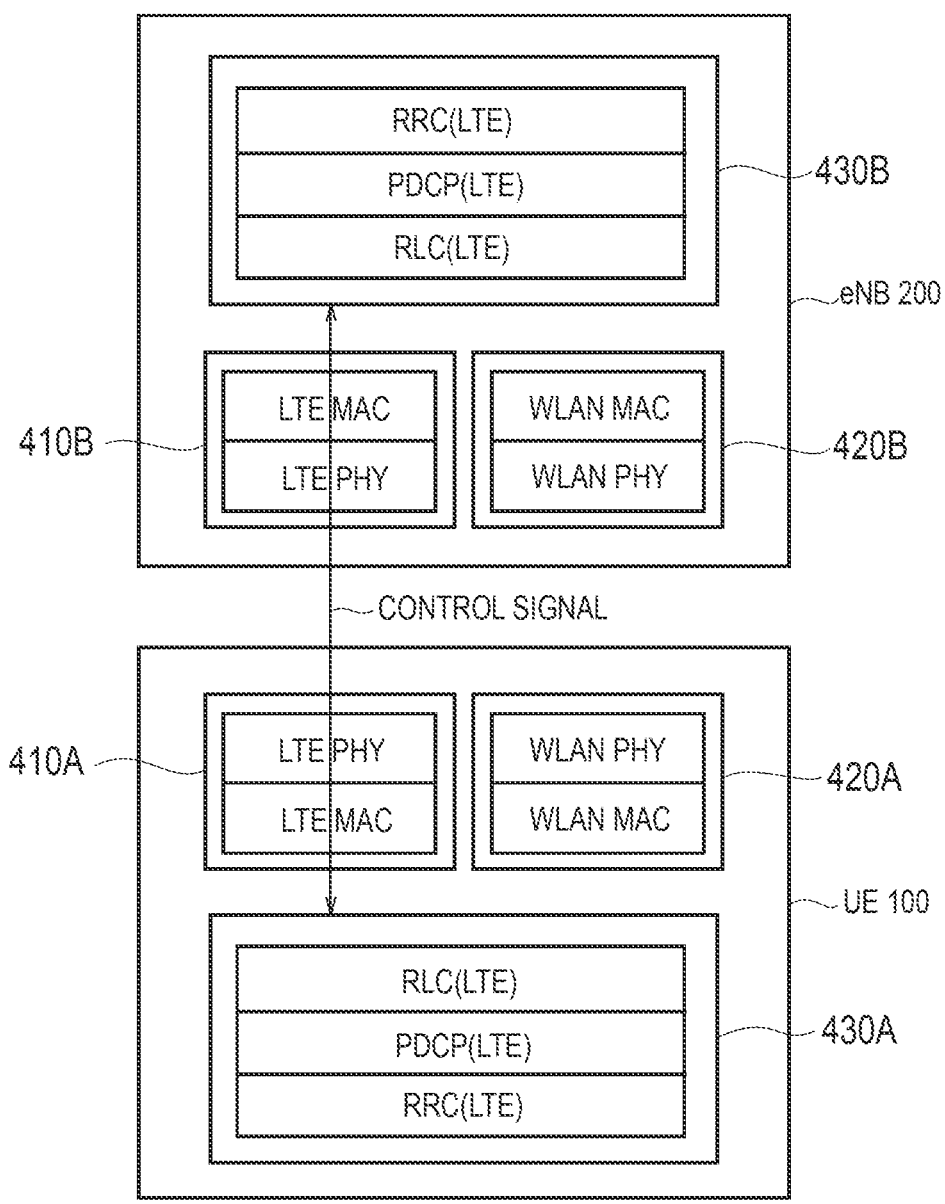
FIG. 16 is a diagram showing an operation according to the fifth embodiment.

FIG. 16 is a diagram showing an operation according to the fifth embodiment. Here, it is assumed that the cellular/WLAN aggregation is being executed.

As shown in FIG. 16, the UE 100 includes a first entity 410A in or below the MAC layer of the cellular communication, a second entity 420A in or below the MAC layer of the WLAN communication, and a third entity 430A in or above the RLC layer of the cellular communication. The third entity 430A may include the RRC layer, in addition to the RLC layer and the PDCP layer. A fourth entity (WLAN RLC adaptation) configured to perform a protocol conversion between the WLAN MAC layer and the LTE RLC layer may be provided between the second entity 420A and the third entity 430A.

The cellular/WLAN collocated eNB 200 includes a first entity 410B in or below the MAC layer of the cellular communication, a second entity 420B in or below the MAC layer of the WLAN communication, and a third entity 430B in or above the RLC layer of the cellular communication. The third entity 430B may include the RRC layer, in addition to the RLC layer and the PDCP layer. A fourth entity (WLAN RLC adaptation) configured to perform a protocol conversion between the WLAN MAC layer and the LTE RLC layer may be provided between the second entity 420B and the third entity 430B.

As described above, the cellular coverage area is wider than the WLAN coverage area. Further, the cellular communication is performed through a licensed band, and thus it is possible to perform stable communication compared to the WLAN communication performed through an unlicensed band.

Therefore, in the cellular/WLAN aggregation, the third entity 430A of the UE 100 transmits and receives control signals with the eNB 200 via the first entity 410A, not via the second entity 420A. Further, the third entity 430B of the eNB 200 transmit and receives a control signal with the UE 100 via the first entity 410B, not via the second entity 420B.

As such, it is possible to stably transmit and receive control signals due to the third entity 430 transmitting and receiving the control signals via the first entity 410B, and thus, it is possible to enhance reliability of the cellular/WLAN aggregation.

The control signals transmitted and received by the third entity 430A, B are control signals of the RLC layer (for example, ACK/NACK). Alternatively, the control signals transmitted and received by the third entity 430A, B may be control signals of the PDCP layer. Alternatively, the control signals transmitted and received by the third entity 430A, B may be a control signals of the RRC layer.

[Sixth Embodiment]

Next, a sixth embodiment will be described. A system configuration, a basic operation of a UE-initiated switching control, a basic operation of cellular/WLAN aggregation, and an operation environment according to the sixth embodiment are similar to those of the first embodiment.

Hereinafter, an operation according to the sixth embodiment will be described while focusing on the differences from the operations according to the first to fifth embodiments.

As described above, the cellular/WLAN aggregation is a technology aiming to enable the dynamic cellular/WLAN radio interworking. Therefore, it is preferable to establish a method of deciding a ratio of cellular/WLAN resource allocation in the cellular/WLAN aggregation.

Figure 17:
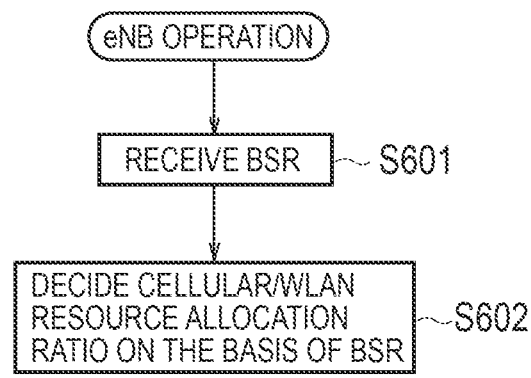
FIG. 17 is a diagram showing an operation of the eNB according to the sixth embodiment.

FIG. 17 is a diagram showing an operation of the eNB 200 according to the sixth embodiment. Here, a case in which the eNB 200 is the cellular/WLAN collocated eNB 200, is assumed.

As shown in FIG. 17, in step S601, the eNB 200 receives, from the UE 100, a buffer state report indicating an amount of untransmitted data of the UE 100, when executing the cellular/WLAN aggregation.

In step S602, the eNB 200 decides, on the basis of the buffer state report, a ratio between a radio resource to be allocated to the UE 100 in an uplink of the cellular communication and a radio resource to be allocated to the UE 100 in an uplink of the WLAN communication.

While the cellular/WLAN aggregation is being executed, the buffer state report is preferably generated by the third entity 430A of the UE 100. That is, the UE 100 notifies the eNB 200 of an amount of untransmitted data in the RLC layer or the PDCP layer by the buffer state report. The buffer state report may include an amount of untransmitted data in the MAC layer and the physical layer. As a result, the eNB 200 is capable of grasping an overall amount of untransmitted data of the UE 100, and appropriately deciding the radio of the cellular/WLAN resource allocation.

Alternatively, when the cellular/WLAN aggregation is started after starting the cellular communication, the buffer state report may be the one generated by the first entity 410A of the UE 100. As a result, the eNB 200 is capable of deciding the ratio of the cellular/WLAN resource allocation at the time of starting the cellular/WLAN aggregation.

When deciding the ratio of the cellular/WLAN resource allocation, the eNB 200 is capable of transmitting control information for setting an uplink transmission ratio, that is a ratio between an amount of transmission data of the UE 100 by the cellular communication and an amount of transmission data of the UE 100 by the WLAN communication, to the UE 100 under the execution of the cellular/WLAN aggregation (the UE 100 that starts the cellular/WLAN aggregation). For example, the eNB 200 may transmit, to the UE 100, an RRC Connection Reconfiguration message including the control information. Alternatively, the eNB 200 may transmit (notify) the control information to the UE 100, by at least any one of DCI, MAC CE, RLC Control PDU, and PDCP Control PDU.

The UE 100 sets, on the basis of the control information, the uplink transmission ratio. The UE 100 transmits, on the basis of the set uplink transmission ratio, transmission data in the uplink by using both the cellular communication and the WLAN communication.

It is noted that when the eNB 200 is not the cellular/WLAN collocated eNB 200, the AP 300 that is a target of the cellular/WLAN aggregation may decide the ratio of the cellular/WLAN resource allocation (or the uplink transmission ratio) and transmit the decided ratio to the eNB 200.

Further, when the eNB 200 is the cellular/WLAN collocated eNB 200, the eNB 200 may decide an uplink transmission ratio on the basis of information by which it is possible to estimate throughput in the WLAN communication. When the eNB 200 is not the cellular/WLAN collocated eNB 200, the eNB 200 may acquire, from the AP 300, information by which it is possible to estimate throughput of the AP 300 configured to execute the cellular/WLAN aggregation, and decide an uplink transmission ratio on the basis of the acquired information.

The information by which it is possible to estimate throughput is at least any one of: the number of UEs connected to the AP 300 (the number of UEs performing the WLAN communication when the eNB 200 is the cellular/WLAN collocated eNB 200); channel usage rate in the WLAN communication (WLAN channel utilization); a downlink frequency band available in the WLAN communication (WLAN DLBandwidth); and an uplink frequency band available in the WLAN communication (WLAN ULBandwidth), for example.

It is noted that the information by which it is possible to estimate throughput may be used for deciding a downlink transmission ratio that is a ratio between an amount of transmission data to the UE 100 by the cellular communication in the downlink (an amount of transmission data of the eNB 200) and an amount of transmission data to the UE 100 by the WLAN communication (an amount of transmission data of the AP 300), in addition to deciding the uplink transmission ratio.

The eNB 200 may decide to execute the cellular/WLAN aggregation only in the downlink. In this case, the uplink transmission ratio is 100 (cellular communication) to 0 (WLAN communication). It is noted that the downlink transmission ratio may be set as 0 (cellular communication) to 100 (WLAN communication).

Further, when a radio link failure in the WLAN communication occurs, the eNB 200 is capable of reducing the usage rate of the WLAN communication to below a setting value. Here, the usage rate of the WLAN communication is indicated by "uplink (downlink) transmission ratio of WLAN communication to uplink (downlink) transmission ratio of cellular communication and WLAN communication (=(uplink (downlink) transmission ratio of WLAN communication)/(uplink (downlink) transmission ratio of cellular communication and WLAN communication))".

The eNB 200, for example, may set the uplink transmission ratio and the downlink transmission ratio as 100 (cellular communication) to 0 (WLAN communication). In this case, the eNB 200 may explicitly transmit, to the UE 100, control information indicating the setting value. This setting value is, for example, the uplink transmission ratio, the downlink transmission ratio, the usage rate of the WLAN communication, and the like.

Alternatively, the UE 100 may autonomously set the uplink transmission ratio and the downlink transmission ratio such that the usage rate of the WLAN communication is reduced to below a threshold value (for example, 100 (cellular communication) to 0 (WLAN communication)). For example, when the UE 100 detects a radio link failure in the WLAN communication and transmits a radio link failure report to the eNB 200, the eNB 200 may determine that the UE 100 autonomously sets the uplink transmission ratio and the downlink transmission ratio.

It is noted that when a radio link failure in the WLAN communication occurs, the eNB 200 may reduce the amount of transmission data in the WLAN communication. This increases the amount of transmission data in the cellular communication, and as a result, the usage rate of the WLAN communication is reduced.

When the radio link failure in the WLAN communication is recovered, the UE 100 may autonomously return the uplink transmission ratio and the downlink transmission ratio to a setting value before the radio link failure in the WLAN communication occurs. Alternatively, the UE 100 may newly set, on the basis of the control information received from the eNB 200, the uplink transmission ratio and the downlink transmission ratio, after the radio link failure in the WLAN communication is recovered.

Alternatively, the UE 100 may be capable of switching a first mode to set the uplink transmission ratio on the basis of the control information received from the eNB 200 and a second mode to autonomously set the uplink transmission ratio. For example, the eNB 200 may transmit, to the UE 100, control information regarding the switching between the first mode and the second mode. The control information may be flag information for switching to the first mode or the second mode. For example, the UE 100 that has received the control information in which a flag indicating the first mode is ON, switches to the first mode, and the UE 100 that has received the control information in which the flag indicating the first mode is OFF, switches to the second mode. Alternatively, the control information may be information indicating a trigger for switching the first mode and the second mode. For example, when a load indicated by load information received from the AP 300 (for example, the WLAN channel usage rate, an available transmission rate of WLAN backhaul) is equal to or above a threshold value, the UE 100 switches to the first mode, and when the load indicated by the load information received from the AP 300 is less than the threshold value, the UE 100 switches to the second mode.

[First Modification of Sixth Embodiment]

Figure 18:
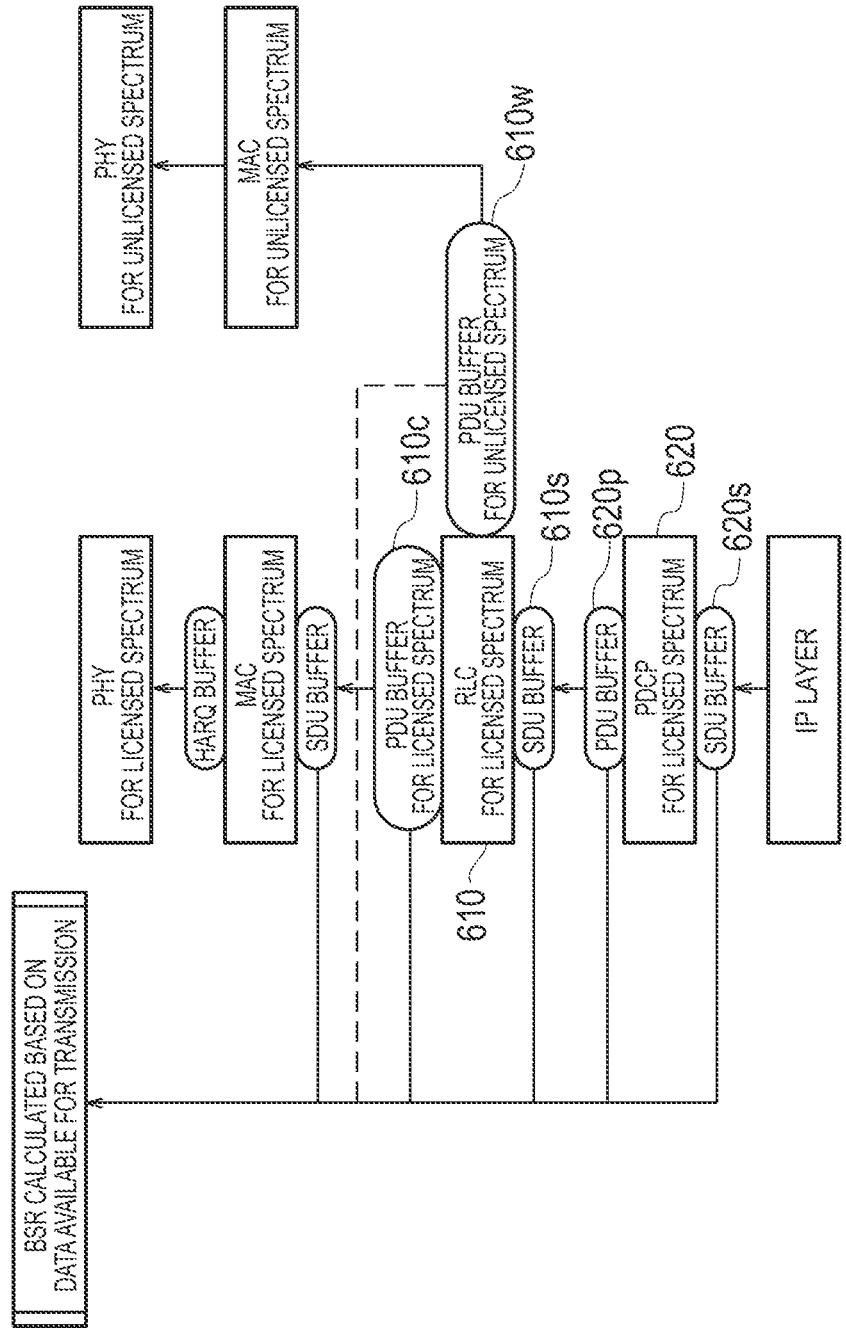
FIG. 18 is a diagram (part 1) for describing a buffer provided in a UE 100 according to a first modification of the sixth embodiment.
Figure 19:
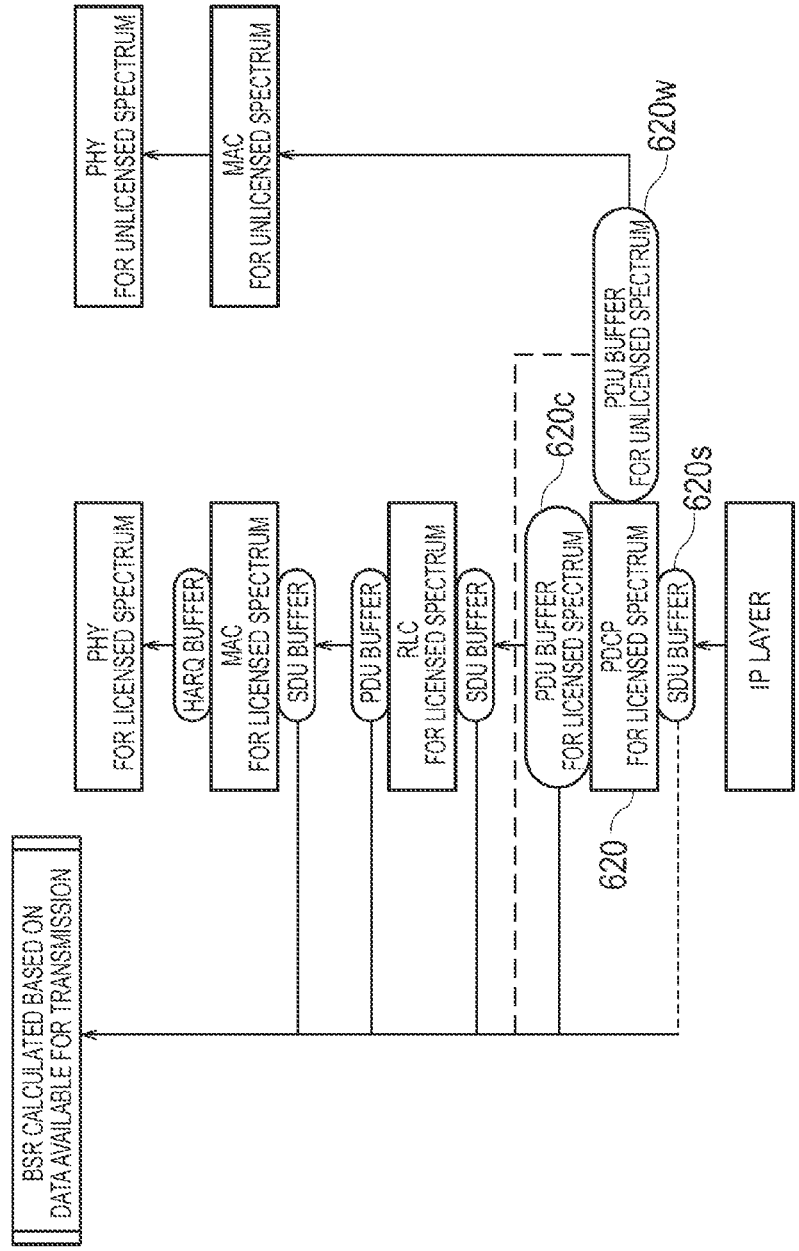
FIG. 19 is a diagram (part 2) for describing the buffer provided in the UE 100 according to the first modification of the sixth embodiment.
Figure 20:
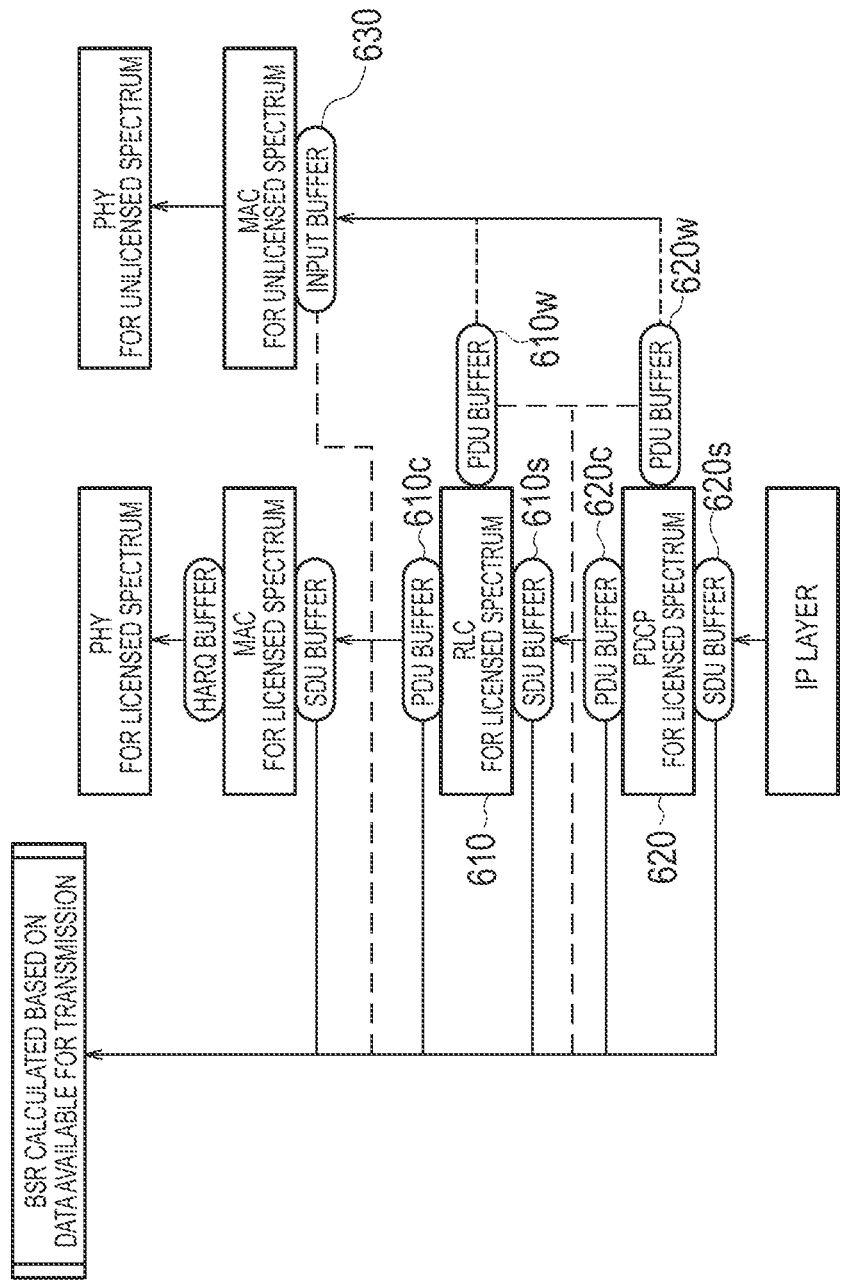
FIG. 20 is a diagram (part 3) for describing the buffer provided in the UE 100 according to the first modification of the sixth embodiment.

Next, a first modification of the sixth embodiment will be described with reference to FIG. 18 to FIG. 20. FIG. 18 is a diagram (part 1) for describing a buffer provided in the UE 100 according to the first modification of the sixth embodiment. FIG. 19 is a diagram (part 2) for describing the buffer provided in the UE 100 according to the first modification of the sixth embodiment. FIG. 20 is a diagram (part 3) for describing the buffer provided in the UE 100 according to the first modification of the sixth embodiment. Hereinafter, a description will be provided while focusing on a portion different from the sixth embodiment, and a description of a similar portion will be omitted, where necessary. In the first modification of the sixth embodiment, a buffer state report transmitted by the UE 100 to the eNB 200 will be described in detail.

In the present modification, the UE 100 configured to execute the cellular/WLAN aggregation has any one of the following buffer forms.

(A) First Buffer Form

As shown in FIG. 18, the UE 100 under the execution of the cellular/WLAN aggregation has a first RLC PDU buffer (PDU buffer for licensed spectrum) 610c configured to store untransmitted data in the cellular communication, and a second RLC PDU buffer (PDU buffer for unlicensed spectrum) 610w configured to store untransmitted data in the WLAN communication. Specifically, the first RLC PDU buffer 610c is processed by an RLC layer 610 and stores a data unit that is waiting to be transmitted to the MAC layer in the cellular communication. The second RLC PDU buffer 610w is processed by the RLC layer 610 and stores a data unit that is waiting to be transmitted to the Mac layer in the WLAN communication.

The first buffer form shows a case in which the untransmitted data in the WLAN communication is not directly reported to the eNB 200 as data for transmission.

During the execution of the cellular/WLAN aggregation, the UE 100 is capable of transmitting, on the basis of the first RLC PDU buffer 610c and the second RLC PDU buffer 610w, a buffer state report (BSR) indicating an amount of untransmitted data, to the eNB 200. Specifically, the UE 100 calculates an amount of untransmitted data indicated by the buffer state report, on the basis of any one of the following first to third methods.

Firstly, the UE 100 calculates only an amount of untransmitted data in the cellular communication, as an amount of untransmitted data. Therefore, the UE 100 is capable of transmitting, to the eNB 200, a buffer state report indicating the amount of untransmitted data. In this case, the amount of untransmitted data indicated by the buffer state report is, for example, an amount of untransmitted data itself stored in the first RLC PDU buffer 610c.

Secondly, the UE 100 calculates an amount of untransmitted data in the cellular communication that is corrected in accordance with the ratio (division ratio) of an amount of transmission data in the uplink of the cellular communication to an amount of transmission data in the uplink of the cellular communication and the WLAN communication.

Here, the untransmitted data in the cellular communication and the WLAN communication is stored in an RLC SDU buffer 610s, a PDCP PDU buffer 620p, and a PDCP SDU buffer 620s. As a result, even though the UE 100 transmits, to the eNB 200, a normal buffer state report indicating those amounts of untransmitted data, it is not possible for the eNB 200 to grasp the amount of untransmitted data in the cellular communication.

Therefore, the UE 100 is capable of transmitting, to the eNB 200, a buffer state report indicating the amount of untransmitted data in the cellular communication that is corrected in accordance with the division ratio. This allows the eNB 200 to grasp the amount of untransmitted data in the cellular communication.

For example, the UE 100 corrects the untransmitted data stored in the RLC SDU buffer 610s in accordance with the division ratio. The UE 100 reports, to the eNB 200, the corrected untransmitted data as the amount of untransmitted data in the cellular communication. It is noted that the UE 100 may correct the amount of untransmitted data stored in the PDCP PDU buffer 620p (or the PDCP SDU buffer 620s) in accordance with the division ratio, and transmit, to the eNB 200, a buffer state report indicating the corrected amount of untransmitted data.

It is noted that the RLC SDU buffer 610s is processed by a PDCP layer 620 and stores a data unit that is waiting to be processed in the RLC layer 610. The PDCP PDU buffer 620p is processed by the PDCP layer 620 and stores a data unit that is waiting to be transmitted to the RLC layer 610. The PDCP SDU buffer 620s stores a data unit that is waiting to be processed in the PDCP layer 620.

Thirdly, the UE 100 calculates an amount of untransmitted data by adding the amount of untransmitted data in the WLAN communication to the amount of untransmitted data in the cellular communication. Therefore, the UE 100 is capable of transmitting, to the eNB 200, a buffer state report indicating the amount of untransmitted data in the cellular communication and the amount of untransmitted data in the WLAN communication. Specifically, the amount of untransmitted data indicated by the buffer state report is a total value of the amount of untransmitted data stored in the first RLC PDU buffer 610c and the second RLC PDU buffer 610w.

As a result, the amount of untransmitted data indicated by the buffer state report takes into consideration not only the amount of untransmitted data in the cellular communication, but also the amount of untransmitted data in the WLAN communication. Therefore, the eNB 200 is capable of appropriately deciding the ratio of the cellular/WLAN resource allocation on the basis of the buffer state report.

It is noted that in the first buffer form, the eNB 200 couples, in the RLC layer, a data unit transmitted from the UE 100 by the cellular communication with a data unit transmitted from the UE 100 by the WLAN communication.

(B) Second Buffer Form

As shown in FIG. 19, the UE 100 under the execution of the cellular/WLAN aggregation has a first PDCP PDU buffer (PDU buffer for licensed spectrum) 620c configured to store untransmitted data in the cellular communication, and a second PDCP PDU buffer (PDU buffer for unlicensed spectrum) 620w configured to store untransmitted data in the WLAN communication. Specifically, the first PDCP PDU buffer 620c is processed by the PDCP layer 620 and stores a data unit that is waiting to be transmitted to the RLC layer in the cellular communication. The second PDCP PDU buffer 610w is processed by the PDCP layer 620 and stores a data unit that is waiting to be transmitted to the MAC layer in the WLAN communication.

During the execution of the cellular/WLAN aggregation, the UE 100 is capable of transmitting, on the basis of the first PDCP PDU buffer 620c and the second PDCP PDU buffer 620w, a buffer state report indicating an amount of untransmitted data, to the eNB 200. Specifically, the UE 100 calculates an amount of untransmitted data indicated by the buffer state report, on the basis of any one of the following first to third methods. It is noted that a description of a portion similar to the above-described first buffer form will be omitted, where necessary.

Firstly, the UE 100 calculates only an amount of untransmitted data in the cellular communication, as an amount of untransmitted data. Therefore, the UE 100 is capable of transmitting, to the eNB 200, a buffer state report indicating the amount of untransmitted data. In this case, the amount of untransmitted data indicated by the buffer state report is, for example, an amount of untransmitted data itself stored in the first PDCP PDU buffer 620c.

Secondly, the UE 100 calculates an amount of untransmitted data in the cellular communication that is corrected in accordance with the division ratio.

For example, the UE 100 corrects the untransmitted data stored in a PDCP SDU buffer 620s in accordance with the division ratio. The UE 100 is capable of reporting, to the eNB 200, the corrected untransmitted data as an amount of untransmitted data in the cellular communication.

Thirdly, the UE 100 calculates an amount of untransmitted data by adding the amount of untransmitted data in the WLAN communication to the amount of untransmitted data in the cellular communication. Specifically, the amount of untransmitted data indicated by the buffer state report is a total value of the amount of untransmitted data stored in the first PDCP PDU buffer 620c and the second PDCP PDU buffer 620w.

It is noted that in the PDCP layer 620, a data unit (packet) stored in the second PDCP PDU buffer 620w may be categorized, depending on a traffic type, into the following four access categories (AC: AC_VO/AC_VI/AC_BE/AC_BK). The PDCP layer 620 may notify an MAC layer at WLAN communication side (MAC for unlicensed spectrum) of the categorized access category type.

AC_VO (priority 1): Voice
AC_VI (priority 2): Video
AC_BE (priority 3): Best Effort
AC_BK (priority 4): Back Ground It is noted that in the second buffer form, the eNB 200 couples, in the PDCP layer, a data unit transmitted from the UE 100 by the cellular communication with a data unit transmitted from the UE 100 by the WLAN communication.

(C) Third Buffer Form

As shown in FIG. 20, the UE 100 under the execution of the cellular/WLAN aggregation has the first RLC PDU buffer 610c, the second RLC PDU buffer 610w, the first PDCP PDU buffer 620c, and the second PDCP PDU buffer 620w. Additionally, the UE 100 has a WLAN input buffer 630 configured to store the untransmitted data in the WLAN communication. The WLAN input buffer 630 stores a data unit that is waiting for a process toward the MAC layer in the WLAN communication. A data unit within the second RLC PDU buffer 610w and a data unit within the second PDCP PDU buffer 620w are input into the WLAN input buffer 630.

The third buffer form shows a case in which it is possible to directly report the untransmitted data in the WLAN communication to the eNB 200 as data for transmission.

Therefore, the UE 100 calculates each of the amount of untransmitted data in the cellular communication and the amount of untransmitted data in the WLAN communication, as an amount of untransmitted data. For example, the amount of untransmitted data in the WLAN communication may be an amount of untransmitted data in at least any one of the second RLC PDU buffer 610w, the second PDCP PDU buffer 620w, and the WLAN input buffer 630, or may be a total value of the second RLC PDU buffer 610w and the second PDCP PDU buffer 620w.

It is noted that in the third buffer form, the eNB 200 couples, in the RLC layer or the PDCP layer, a data unit transmitted from the UE 100 by the cellular communication with a data unit transmitted from the UE 100 by the WLAN communication.

It is noted that when a data bearer for the cellular/WLAN aggregation is divided in the RLC layer, the UE 100 may have the first RLC PDU buffer 610c, the second RLC PDU buffer 610w, and a normal RLC PDU buffer, and may not have the first PDCP PDU buffer 620c and the second PDCP PDU buffer 620w. Further, when a data bearer for the cellular/WLAN aggregation is divided in the PDCP layer, the UE 100 may have the first PDCP PDU buffer 620c, the second PDCP PDU buffer 620w, and a normal PDCP PDU buffer, and may not have the first RLC PDU buffer 610c and the second RLC PDU buffer 610w.

[Second Modification of Sixth Embodiment]

Next, a second modification of the sixth embodiment will be described. In the second modification of the sixth embodiment, an example in which the UE 100 decides the uplink transmission ratio, will be described.

During the execution of the cellular/WLAN aggregation, the UE 100 is capable of deciding a ratio between an amount of transmission data in the uplink of the cellular communication and an amount of transmission data in the uplink of the WLAN communication, on the basis of the number of data units received successfully in the downlink of the cellular communication and the number of data units received successfully in the downlink of the WLAN communication. It is noted that the data unit received successfully is a data unit that is properly decoded in the UE 100.

For example, it is assumed that the eNB 200 sets the downlink transmission ratio as 70 (cellular communication) to 30 (WLAN communication), and the eNB 200 and the AP 300 transmit data to the UE 100 through the cellular/WLAN aggregation. On the other hand, the UE 100 assumes that the number of data units received successfully in the cellular communication (the number of cellular data units) is 30, and the number of data units received successfully in the WLAN communication (the number of WLAN data units) is 30. The UE 100 decides the uplink transmission ratio as 50 (30) to 50 (30), on the basis of the number of received data units (the number of cellular data units and the number of WLAN data units). Then, the UE 100 transmits data in accordance with the decided uplink transmission ratio.

It is noted that the number of data units received successfully may be the number of data units received successfully per a unit time. The eNB 200 notifies the UE 100 of information of this unit time (for example, 30 s), and the UE 100 counts the number of data units received successfully per a unit time. For example, the UE 100 counts the number of data units received successfully in the past 30 s. Further, the uplink transmission ratio may be decided on the basis of an average value (for example, moving average) of the number of data units received in a predetermined period. The eNB 200 may notify the UE 100 of information for deciding, on the basis of the average value, the uplink transmission ratio.

Alternatively, when satisfying "(rate of reception data of WLAN communication)+α (coefficient)>(rate of uplink transmission data of previous WLAN communication)", the UE 100 may decide the uplink transmission ratio such that the rate of uplink transmission data of the next WLAN communication becomes larger than the rate of uplink transmission data of the previous WLAN communication, and when not satisfying the above equation, the UE 100 may decide the uplink transmission ratio such that the rate of uplink transmission data of the next WLAN communication becomes smaller than the rate of uplink transmission data of the previous WLAN communication. It is noted that the eNB 200 may notify the UE 100 of information indicating a (coefficient).

It is noted that "rate of reception data of WLAN communication=(number of WLAN data units)/(number of cellular data units+number of WLAN data units)", and "rate of uplink transmission data of WLAN communication=(amount of uplink transmission data by WLAN communication)/(amount of uplink transmission data by cellular communication+amount of uplink transmission data by WLAN communication)".

The UE 100 is capable of taking into consideration the (downlink) transmission ratio decided by the eNB 200 as well as a radio situation, and thus, it is possible to efficiently decide the uplink transmission ratio. Moreover, the control information regarding the uplink transmission ratio from the eNB 200 is not necessary, and thus, it is possible to reduce signaling.

Further, the eNB 200 may decide the downlink transmission ratio between the amount of transmission data to the UE 100 by the cellular communication and the amount of transmission data to the UE 100 by the WLAN communication, on the basis of the number of data units from the UE 100 received successfully by the cellular communication (the number of cellular data units) and the number of data units from the UE 100 received successfully by the WLAN communication (the number of WLAN data units). For example, when the number of data units received successfully by the cellular communication is 30 and the number of data units received successfully by the WLAN communication via the AP 300 is 30, the eNB 200 decides the downlink transmission ratio as 50 (30) to 50 (30).

Alternatively, when satisfying "(rate of reception data of WLAN communication)+α (coefficient)>(rate of downlink transmission data of previous WLAN communication)", the eNB 200 may decide the downlink transmission ratio such that the rate of downlink transmission data of the next WLAN communication becomes larger than the ratio of downlink transmission data of the previous WLAN communication, and when not satisfying the above equation, the eNB 200 may decide the downlink transmission ratio such that the rate of downlink transmission data of the next WLAN communication becomes smaller than the rate of downlink transmission data of the previous WLAN communication.

It is noted that "rate of reception data of WLAN communication=(number of WLAN data units)/(number of cellular data units+number of WLAN data units)", and "rate of downlink transmission data of WLAN communication=(amount of downlink transmission data by WLAN communication)/(amount of downlink transmission data by cellular communication+amount of downlink transmission data by WLAN communication)".

The eNB 200 is capable of taking into consideration a radio situation to effectively decide the uplink transmission ratio.

It is noted that similarly to the above-described sixth embodiment, the eNB 200 may transmit, to the UE 100, the control information regarding switching between the first mode and the second mode (a mode for autonomously setting (deciding) the uplink transmission ratio on the basis of the number of cellular data units and the number of WLAN data units).

[Seventh Embodiment]

Next, a seventh embodiment will be described. A system configuration, a basic operation of a UE-initiated switching control, a basic operation of cellular/WLAN aggregation, and an operation environment according to the seventh embodiment is similar to those of the first embodiment.

Hereinafter, an operation according to the seventh embodiment will be described while focusing on the differences from the operations according to the first to sixth embodiments.

The seventh embodiment relates to a method for starting the cellular/WLAN aggregation by the UE 100 selecting the WLAN communication. In order for the UE 100 selecting the WLAN communication to start the cellular/WLAN aggregation, the UE 100 needs to establish a cellular communication connection with the eNB 200. When a WLAN identifier of a node configured to support the cellular/WLAN aggregation is notified to the UE 100, the UE 100 preferably establishes a cellular communication connection with the eNB 200 after confirming that a connection destination node of the WLAN communication supports the cellular/WLAN aggregation.

Alternatively, the UE 100 may start the cellular/WLAN aggregation when detecting that QoS in the WLAN communication is not satisfied. When a WLAN identifier of a node configured to support the cellular/WLAN aggregation is notified to the UE 100, the UE 100 preferably performs a process to start the cellular/WLAN aggregation after confirming that a connection destination node of the WLAN communication supports the cellular/WLAN aggregation.

FIG. 21 is a diagram showing an operation according to the seventh embodiment. Here, a case in which the UE 100 detects that QoS in the WLAN communication is not satisfied, is assumed.

As shown in FIG. 21, in step S701, the UE 100 transmits by the cellular communication, to the E-UTRAN 10 (eNB 200), a notification indicating that QoS in the WLAN communication is not satisfied.

In step S702, the E-UTRAN 10 transmits, to the UE 100, setting information for starting the cellular/WLAN aggregation, in response to the notification from the UE 100.

In step S703, the UE 100 starts the cellular/WLAN aggregation, on the basis of the setting information from the E-UTRAN 10.

[Eighth Embodiment]

Next, an eighth embodiment will be described. A system configuration, a basic operation of a UE-initiated switching control, a basic operation of cellular/WLAN aggregation, and an operation environment according to the eighth embodiment is similar to those of the first embodiment.

Hereinafter, an operation according to the eighth embodiment will be described while focusing on the differences from the operations according to the first to seventh embodiments.

The eighth embodiment relates to a condition that permits the cellular/WLAN aggregation. Specifically, a condition that permits the start of the cellular/WLAN aggregation is defined by using the determination conditions in the UE-initiated switching control.

In the eighth embodiment, when both the second determination condition for switching from the cellular communication to the WLAN communication and the third determination condition for switching from the WLAN communication to the cellular communication are satisfied, the UE 100 enables the cellular/WLAN aggregation. As described above, the second determination condition is a determination condition regarding WLAN (that is, a WLAN side determination condition). The third determination condition is a determination condition regarding cellular (that is, a cellular side determination condition).

This allows the UE 100 to start the cellular/WLAN aggregation after understanding that both the WLAN communication and the cellular communication are possible to be performed in a good state.

FIG. 22 is a diagram showing an operation of the UE 100 according to the eighth embodiment.

As shown in FIG. 22, in step S801, the UE 100 confirms whether or not both the second determination condition for switching from the cellular communication to the WLAN communication (WLAN side determination condition) and the third determination condition for switching from the WLAN communication to the cellular communication (cellular side determination condition) are satisfied.

When at least one of the second determination condition and the third determination condition is not satisfied, in step S802, the UE 100 disables the cellular/WLAN aggregation.

On the other hand, when both of the second determination condition and the third determination condition are satisfied, in step S803, the UE 100 enables the cellular/WLAN aggregation.

Step S801 may be a step of confirming whether or not a part of a plurality of conditions constituting the second determination condition (WLAN side determination condition) and a part of a plurality of conditions constituting the third determination condition (cellular side determination condition) are satisfied. For example, it may be a step that confirms whether or not one to four out of "ChannelUtilizationWLAN<Thresh$_{ChUtilWLAN, Low}$", "BackhaulRateDlWLAN>Thresh$_{BackhRateDLWLAN, High}$", "BackhaulRateUlWLAN>Thresh$_{BackhRateULWLAN, High}$", and "BeaconRSSI>Thresh$_{BeaconRSSIWLAN, High}$" of the second determination condition is/are satisfied, as well as whether or not one of "RSRPmeas>Thresh$_{ServingOffloadWLAN, HighP}$" and "RSRQmeas Thresh$_{ServingOffloadWLAN, HighQ}$" of the third determination condition is satisfied.

Further, different values may be used for threshold values used in the second determination condition (WLAN side determination condition) and the third determination condition (cellular side determination condition), when used in the UE-initiated switching control and when used in the determination of the cellular/WLAN aggregation (step S801). By using a threshold value dedicated for the determination of the cellular/WLAN aggregation (step S801), it is possible to control the probability of enabling/disabling the cellular/WLAN aggregation.

[Ninth Embodiment]

Next, a ninth embodiment will be described. A system configuration, a basic operation of a UE-initiated switching control, a basic operation of cellular/WLAN aggregation, and an operation environment according to the ninth embodiment is similar to those of the first embodiment.

Hereinafter, an operation according to the ninth embodiment will be described while focusing on the differences from the operations according to the first to eighth embodiments.

The ninth embodiment relates to a handling when a problem occurs in the WLAN communication during the execution of the cellular/WLAN aggregation.

In the ninth embodiment, when a predetermined determination condition for switching from the WLAN communication to the cellular communication is satisfied during the execution of the cellular/WLAN aggregation, the UE 100 determines that a radio link failure (RLF) in the WLAN communication has occurred. The predetermined determination condition is the above-described fourth determination condition (that is, a WLAN side determination condition). This allows the UE 100 to appropriately suspend the WLAN communication. However, the UE 100 may continue the cellular communication while suspending the WLAN communication.

When determining that a radio link failure in the WLAN communication has occurred, the UE 100 may transmit by the cellular communication, to the eNB 200, a radio link failure report (RLF report) regarding the radio link failure. This allows the eNB 200 to grasp the situation regarding a problem in the WLAN communication and radio link failure.

Further, when determining that the radio link failure in the WLAN communication has occurred, the UE 100 may transmit by the cellular communication, to the eNB 200, a PDCP state report indicating a data transmission state in the PDCP layer.

FIG. 23 is a diagram showing an operation of the UE 100 according to the ninth embodiment.

As shown in FIG. 23, in step S901, the UE 100 starts the cellular/WLAN aggregation.

In step S902, the UE 100 confirms whether or not the fourth determination condition for switching from the WLAN communication to the cellular communication (WLAN side determination condition) is satisfied.

When the fourth determination condition (WLAN side determination condition) is satisfied, in step S903, the UE 100 determines that a radio link failure in the WLAN communication has occurred.

[First Modification of Ninth Embodiment]

Next, a first modification of the ninth embodiment will be described. In the present modification, another case of the case in which the UE 100 determines that a radio link failure in the WLAN communication (hereinafter, "W-RLF") has occurred, will be described.

Firstly, the UE 100 is capable of determining, on the basis of an interference state of a WLAN frequency band in the WLAN communication, that the W-RLF has occurred.

First of all, the UE 100 performs "carrier sense" that measures the interference state of the WLAN frequency band in the WLAN communication. As a result of performing the carrier sense, when an interference power amount in the WLAN frequency band is equal to or above a predetermined value, the UE 100 activates a timer. While continuing the carrier sense, when the interference power amount is equal to or above the predetermined value after the timer expires, the UE 100 determines that the W-RLF has occurred. It is noted that when the interference power amount becomes less than the predetermined value before the timer expires, the UE 100 determines that the W-RLF is not occurred and resets the timer. It is noted that the eNB 200 may transmit, to the UE 100, setting information for setting the predetermined value.

Alternatively, the UE 100 increases a counter by one every time the interference power amount in the WLAN frequency band is equal to or above the predetermined value when preforming the carrier sense. When the counter reaches a threshold value, the UE 100 determines that the W-RLF has occurred. It is noted that when the interference power amount becomes less than the predetermined value before the counter reaches the threshold value, the UE 100 determines that the W-RLF is not occurred and resets the counter. It is noted that the eNB 200 may transmit, to the UE 100, setting information for setting the threshold value.

Secondly, the UE 100 is capable of determining, on the basis of a failure in transmission and reception in the WLAN communication in the cellular/WLAN aggregation, that the W-RLF has occurred.

First of all, when a reception (or transmission) of data fails, the UE 100 activates a timer. When the reception (or transmission) of data fails after the timer expires, the UE 100 determines that the W-RLF has occurred. It is noted that when the reception (or transmission) of data succeeds before the timer expires, the UE 100 determines that the W-RLF is not occurred and resets the timer. It is noted that the eNB 200 may transmit, to the UE 100, setting information for setting a value of the timer.

Alternatively, the UE 100 increases the counter by one when the reception (or transmission) of data fails. When the counter reaches a threshold value, the UE 100 determines that the W-RLF has occurred. It is noted that when the reception (or transmission) of data succeeds before the counter reaches the threshold value, the UE 100 determines that the W-RLF is not occurred and resets the counter. It is noted that the eNB 200 may transmit, to the UE 100, setting information for setting the threshold value.

Thirdly, the UE 100 activates the timer when the received strength (desired wave power value: for example, Beacon RSSI (Received Signal Strength Indicator), RCPI (Received Channel Power Indicator), RSNI (Received Signal Noise Indicator) etc.) of a radio signal from the AP 300 performing the WLAN communication in the cellular/WLAN aggregation (or the cellular/WLAN collocated eNB 200) falls below the threshold value. When the received strength of a radio signal falls below the threshold value after the timer expires, the UE 100 determines that the W-RLF has occurred. It is noted that when the received strength of a radio signal exceeds the threshold value before the timer expires, the UE 100 determines that the W-RLF is not occurred and resets the timer. It is noted that the eNB 200 may transmit, to the UE 100, setting information for setting the threshold value.

Alternatively, the UE 100 increases the counter by one when the received strength (Beacon RSSI) of a radio signal from the AP 300 performing the WLAN communication in the cellular/WLAN aggregation (or the cellular/WLAN collocated eNB 200) falls below the threshold value. When the counter reaches a threshold value, the UE 100 determines that the W-RLF has occurred. It is noted that when the received strength (Beacon RSSI) of a radio signal exceeds the threshold value before the counter reaches the threshold value, the UE 100 determines that the W-RLF is not occurred and resets the counter. It is noted that the eNB 200 may transmit, to the UE 100, setting information for setting the threshold value.

Fourthly, when a connection with the AP 300 performing the WLAN communication in the cellular/WLAN aggregation is disconnected, the UE 100 determines that the W-RLF has occurred. When a connection with the AP 300 is established again, the UE 100 determines that the W-RLF is recovered.

Fifthly, the UE 100 activates the timer when a backhaul rate of the AP 300 performing the WLAN communication in the cellular/WLAN aggregation falls below a threshold value. When the backhaul rate falls below the threshold value after the timer expires, the UE 100 determines that the W-RLF has occurred. It is noted that when the backhaul rate becomes equal to or above the threshold value before the timer expires, the UE 100 determines that the W-RLF is not occurred and resets the timer. It is noted that the eNB 200 may transmit, to the UE 100, setting information for setting a value of the timer.

Alternatively, the UE 100 increases the counter by one when the backhaul rate falls below the threshold value. When the counter reaches a threshold value, the UE 100 determines that the W-RLF has occurred. It is noted that when the backhaul rate becomes equal to or above the threshold value before the counter reaches the threshold value, the UE 100 determines that the W-RLF has not occurred and resets the counter. It is noted that the eNB 200 may transmit, to the UE 100, setting information for setting the threshold value.

When determining that the W-RLF has occurred, the UE 100 transmits by an RRC message, to the eNB 200, a radio link failure report regarding the W-RLF (hereinafter, a "W-RLF report"). The W-RLF report may include information of at least any one of: a reason by which the W-RLF is determined to occur; and the most recent measurement result regarding the WLAN communication measured by the UE 100 (for example, a result of carrier sense, a measurement result of Beacon RSSI, a measurement result of RCPI, a measurement result of RSNI, etc.). It is noted that the reason by which the W-RLF is determined to occur is, for example, the W-RLF report is at least any one of: the interference state of the WLAN frequency band in the WLAN communication; a failure in transmission and reception in the WLAN communication; the received strength of a radio signal from the AP 300 performing the WLAN communication; and disconnection from the AP 300.

The eNB 200 receives the W-RLF report from the UE 100, during the execution (control) of the cellular/WLAN aggregation. For example, the eNB 200 transmits, on the basis of the W-RLF report, to the AP 300 under the execution of the cellular/WLAN aggregation, information for releasing a data bearer for the WLAN communication in the cellular/WLAN aggregation (WLAN Release Request), or information for changing the data bearer for the WLAN communication in the cellular/WLAN aggregation to another data bearer (WLAN Modification Request). The AP 300 that has received the WLAN Release Request releases the data bearer for the WLAN communication in the cellular/WLAN aggregation. On the other hand, the AP 300 that has received the WLAN Modification Request starts control for changing the data bearer for the WLAN communication in the cellular/WLAN aggregation to another data bearer. For example, when executing the cellular/WLAN aggregation in a WLAN frequency band 1, the AP 300 performs the carrier sense, and starts control for executing the cellular/WLAN aggregation in a WLAN frequency band 2 of which the interference power amount is less than the threshold value.

When a change (or release) of the data bearer for the WLAN communication in the cellular/WLAN aggregation is performed, the eNB 200 transmits, to the UE 100, an RRC Connection Reconfiguration message for notifying the UE 100 of the change (or release) of the data bearer.

Further, the eNB 200 may transmit the W-RLF report to the AP 300 under the execution of the cellular/WLAN aggregation. The AP 300 is capable of (temporarily) stopping the WLAN communication in the cellular/WLAN aggregation on the basis of the W-RLF report. When the carrier sense is performed and then the interference power amount becomes less than the threshold value, the AP 300 is capable of restarting the WLAN communication in the cellular/WLAN aggregation. It is noted that the AP 300 is capable of deciding and setting (adjusting), on the basis of the W-RLF report, a parameter (for example, a timer for detecting the W-RLF, a threshold value for detecting the W-RLF, etc.).

Here, the eNB 200 transmits, to the AP 300, downlink data scheduled to be transmitted to the UE 100 by the WLAN communication in the cellular/WLAN aggregation via a direct communication pathway, for example. Before the W-RLF occurs, the AP 300 transmits, to the UE 100, downlink data scheduled to be transmitted to the UE 100 received from the eNB 200. On the other hand, when the W-RLF occurs, there is high possibility that the UE 100 is not capable of receiving the downlink data even though the AP 300 transmits the downlink data to the UE 100.

Therefore, when the W-RLF occurs, the AP 300 may transmit, to the eNB 200, downlink data that is not transmitted to the UE 100. When releasing the data bearer for the WLAN communication in the cellular/WLAN aggregation, the AP 300 may transmit (transfer), to the eNB 200, downlink data that is not transmitted to the UE 100. Alternatively, when the eNB 200 has already deleted (flashed) downlink data (deleted) transmitted to the AP 300 (when the eNB 200 does not store downlink data transmitted to the AP 300), the eNB 200 may perform control to transmit, to the AP 300, a transmission request of downlink data that is not transmitted to the UE 100. The eNB 200 may include the transmission request of downlink data into the WLAN Release Request, the WLAN Modification Request, etc., for example. Alternatively, the eNB 200 may include the transmission request of downlink data into UE Context Release requiring a release of information of the UE 100 that becomes a target of the cellular/WLAN aggregation. When receiving the transmission request of downlink data, the AP 300 may transmit (transfer) untransmitted downlink data to the eNB 200. The eNB 200 transmits, to the UE 100, the untransmitted downlink data received from the AP 300.

It is noted that when determining that the W-RLF has occurred, the UE 100 may transmit, to the eNB 200, control information (Control PDU, for example, PDCP/RLC Status PDU) for informing the eNB 200 of data not received (or not transmitted) (or, data received (or transmitted)). The eNB 200 performs, on the basis of the control information, control to transmit (or receive) corresponding data to the UE 100.

Further, when determining that the W-RLF is recovered (the W-RLF has not occurred for a predetermined period), the UE 100 may transmit, to the eNB 200, a radio link failure recovered report (hereinafter, a "W-RLR (WLAN Radio Link Recovered) report") indicating that a radio link failure in the WLAN communication is recovered. For example, when determining, on the basis of the above-described W-RLF determination standard, that the W-RLF has not occurred for a predetermined period, the UE 100 is capable of transmitting the W-RLR report to the eNB 200. When receiving the W-RLR report, the eNB 200 is capable of grasping a radio link state in the WLAN communication. As a result, the eNB 200 is capable of appropriately deciding an uplink transmission ratio and a downlink transmission ratio in the cellular/WLAN communication aggregation, and appropriately performing control of a setting regarding the cellular/WLAN communication aggregation, and thus, it is possible to efficiently control the cellular/WLAN communication aggregation.

[Second Modification of Ninth Embodiment]

Next, a second modification of the ninth embodiment will be described. In the second modification of the ninth embodiment, a case in which the AP 300 under the execution of the cellular/WLAN aggregation determines that the W-RLF has occurred will be described. A description of parts similar to the UE 100 will be omitted, where necessary.

When determining that the W-RLF has occurred, the AP 300 transmits, to the eNB 200, the W-RLF report by using a direct communication pathway, for example. Similarly to the above-described UE 100, the AP 300 is capable of determining that the W-RLF has occurred. The W-RLF report may include information of at least any one of: a reason by which the W-RLF is determined to occur; and the most recent measurement result regarding the WLAN communication measured by the AP 300 (for example, a result of carrier sense, a received strength of a reference signal from the UE 100, etc.).

The eNB 200 that has received the W-RLF report may transmit, to the AP 300, the WLAN Release Request or the WLAN Modification Request, as a response to the W-RLF report. Further, the eNB 200 that has received the W-RLF report may transmit, to the AP 300, a response to the W-RLF report including a transmission request of downlink data that is not transmitted to the UE 100.

Further, when determining that the W-RLF has occurred, the AP 300 may transmit, to the eNB 200, a request for releasing the data bearer for the WLAN communication in the cellular/WLAN aggregation (WLAN Release Required) or a request for changing the data bearer for the WLAN communication in the cellular/WLAN aggregation to another data bearer (WLAN Modification Required) by using a direct communication pathway, for example. In this case, the AP 300 may omit the transmission of the W-RLF report.

The eNB 200 may transmit, on the basis of the WLAN Release Required, the WLAN Release Request to the AP 300. Further, the eNB 200 may transmit, on the basis of the WLAN Modification Required, the WLAN Modification Request to the AP 300.

It is noted that similarly to the above-described UE 100, when determining that the W-RLF has not occurred for a predetermined period, the AP 300 may transmit the W-RLR report to the eNB 200.

[Tenth Embodiment]

Next, a tenth embodiment will be described. A system configuration, a basic operation of a UE-initiated switching control, a basic operation of cellular/WLAN aggregation, and an operation environment according to the tenth embodiment is similar to those of the first embodiment.

Hereinafter, an operation according to the tenth embodiment will be described while focusing on the differences from the operations according to the first to ninth embodiments.

The tenth embodiment relates to a condition that permits the cellular/WLAN aggregation in view of a contract situation of a user of the UE 100. The cellular/WLAN aggregation is capable of increasing throughput; however, a load at a network side is increased. Therefore, it is preferable to limit the UE 100, to which the cellular/WLAN aggregation is permitted, in accordance with a subscriber class (GoS: Grade of Service).

In the tenth embodiment, the cellular network (the eNB 200 or the ANDSF server) transmits, to the UE 100, subscriber class information indicating a subscriber class to which the cellular/WLAN aggregation is permitted or prohibited. For example, when four types of subscriber classes are stipulated, the cellular network transmits 2-bit information as the subscriber class information. The information has four patterns of "00", "01", "10", and "11". "00" is the lowest subscriber class and "11" is the highest subscriber class.

The UE 100 determines whether or not the cellular/WLAN aggregation is permitted, on the basis of the subscriber class information received from the cellular network and a subscriber class of the UE 100. For example, when the subscriber class of the UE 100 is "11", and when "11" is designated as the subscriber class to which the cellular/WLAN aggregation is permitted, the UE 100 determines that the cellular/WLAN aggregation is permitted.

FIG. 24 is a diagram showing an operation of the UE 100 according to the tenth embodiment.

As shown in FIG. 24, in step S1001, the UE 100 receives the subscriber class information from the cellular network.

In step S1002, the UE 100 determines whether or not the cellular/WLAN aggregation is permitted, on the basis of the subscriber class information and the subscriber class of the UE 100.

When determining that the cellular/WLAN aggregation is prohibited, in step S1003, the UE 100 disables the cellular/WLAN aggregation.

On the other hand, when determining that the cellular/WLAN aggregation is permitted, in step S1004, the UE 100 enables the cellular/WLAN aggregation.

[Eleventh Embodiment]

Next, an eleventh embodiment will be described. A system configuration, a basic operation of a UE-initiated switching control, a basic operation of cellular/WLAN aggregation, and an operation environment according to the eleventh embodiment is similar to those of the first embodiment.

Hereinafter, an operation according to the eleventh embodiment will be described while focusing on the differences from the operations according to the first to tenth embodiments.

The eleventh embodiment relates to a method for enabling the cellular/WLAN aggregation without adding any changes to the UE-initiated switching control.

In the eleventh embodiment, the UE 100 performs the UE-initiated switching control. A specific WLAN identifier is designated to the UE 100 from the cellular network, and when switching to the WLAN communication corresponding to the specific WLAN identifier, the UE 100 transmits a switching notification to the eNB 200 by the cellular communication. The specific WLAN identifier is a WLAN identifier assigned to the node configured to support the cellular/WLAN aggregation. A designation method of a specific WLAN identifier is similar to the above-described embodiment. The eNB 200 performs control to start the cellular/WLAN aggregation in response to the switching notification from the UE 100.

An operation according to the eleventh embodiment will be described by using FIG. 21. Here, a case is assumed in which the UE 100 switches, by the UE-initiated switching control, to the WLAN communication corresponding to the specific WLAN identifier from the cellular communication.

As shown in FIG. 21, in step S701, the UE 100 transmits by the cellular communication, to the E-UTRAN 10 (eNB 200), a notification indicating a switching to the WLAN communication corresponding to the specific WLAN identifier.

In step S702, the E-UTRAN 10 transmits, to the UE 100, setting information for starting the cellular/WLAN aggregation, in response to the notification from the UE 100.

In step S703, the UE 100 starts the cellular/WLAN aggregation, on the basis of the setting information from the E-UTRAN 10.

[Other Embodiments]

In each of the above-described embodiments, an example is described in which the cellular/WLAN aggregation is a technology by which traffic belonging to the identical data bearer is transmitted and received by using both the cellular communication and the WLAN communication. However, the cellular/WLAN aggregation may be the one by which traffic belonging to different data bearers is transmitted and received by using both the cellular communication and the WLAN communication. For example, a bearer 1 and a bearer 2 may be transmitted and received by the cellular communication (LTE communication) while a bearer 3 and a bearer 4 may be transmitted and received by the WLAN communication.

Figure 25:
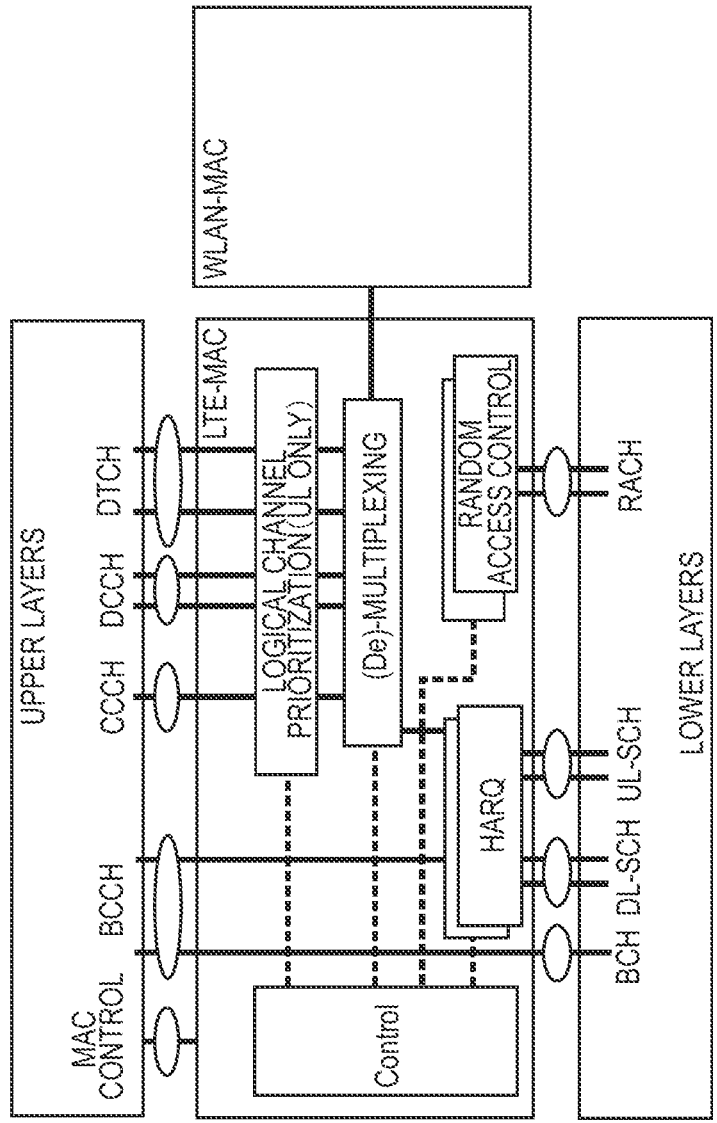
FIG. 25 is a diagram showing another example of the cellular/WLAN aggregation.

In each of the above-described embodiments, in the cellular/WLAN aggregation, an example of dividing/reconfiguring, in the RLC layer, traffic belonging to the identical data bearer, is described. However, in the cellular/WLAN aggregation, traffic belonging to the identical data bearer may be divided/coupled in the MAC layer. FIG. 25 is a diagram showing another example of the cellular/WLAN aggregation. As shown in FIG. 25, the LTE MAC layer has a (De)-Multiplexing function for changing a path for the transmission and reception (LTE/WLAN) in an MAC PDU unit.

In the above-described sixth embodiment, the cellular/WLAN aggregation by which traffic belonging to the identical (or different) data bearer is transmitted and received by using both the cellular communication between the eNB 200 and the UE 100, and the WLAN communication between the AP 300 (or the cellular/WLAN collocated eNB 200) and the UE 100, is described as an example; however, this is not limiting. A similar operation to the sixth embodiment and the first and second modifications thereof may be executed in a dual connectivity scheme (Dual Connectivity) by which traffic belonging to the identical data bearer or different data bearers is transmitted and received by using both the cellular communication between the eNB 200 and the UE 100 (hereinafter, "first cellular communication"), and the cellular communication between another eNB (SeNB) 200 connected to the eNB 200 via a direct interface (X2 interface) and the UE 100 (hereinafter, "second cellular communication").

Here, in the dual connectivity scheme, the UE 100 establishes an RRC connection with the eNB (MeNB) 200, and establishes a radio bearer (data bearer) used for exchanging user data without establishing the RRC connection with another eNB (SeNB) 200.

When the eNB 200 is not the cellular/WLAN collocated eNB 200, a data bearer used in the cellular/WLAN aggregation and a data bearer used in the dual connectivity scheme are the identical communication path. Specifically, these data bearers are the data bearer divided in the eNB 200, and one of the divided data bearer is a data bearer via the eNB 200 but not via the AP 300 (or another eNB 200), and the other one of the divided data bearer is a data bearer via the eNB 200 and the AP 300 (or another eNB 200).

The eNB 200 under the execution of the dual connectivity scheme may receive, from the UE 100, a buffer state report indicating an amount of untransmitted data of the UE 100. The eNB 200 may decide, on the basis of the buffer state report, a ratio between a radio resource to be allocated to the UE 100 in the uplink of the first cellular communication and a radio resource to be allocated to the UE 100 in the uplink of the second cellular communication.

Further, the UE 100 under the execution of the dual connectivity scheme may have a first buffer configured to store untransmitted data in the first cellular communication, and a second buffer configured to store untransmitted data in the second cellular communication.

Further, the eNB 200 under the execution of the dual connectivity scheme may transmit, to the UE 100 under the execution of the dual connectivity scheme, control information for setting an uplink transmission ratio that is a ratio between an amount of transmission data of the UE 100 by the first cellular communication and an amount of transmission data of the UE 100 by the second cellular communication.

Further, the eNB 200 may transmit, to the UE 100 under the execution of the dual connectivity scheme, control information for setting an uplink transmission ratio that is a ratio between an amount of transmission data of the UE 100 by the first cellular communication and an amount of transmission data of the UE 100 by the second cellular communication.

Further, when the UE 100 is under the execution of the dual connectivity scheme, the eNB 200 may decide a ratio between an amount of transmission data to the UE 100 by the first cellular communication and an amount of transmission data to the UE 100 by the second cellular communication, on the basis of the number of data units from the UE 100 received successfully by the first cellular communication and the number of data units from the UE 100 received successfully by the second cellular communication.

In the above-described sixth and ninth embodiments, the eNB 200 detects the occurrence of the W-RLF on the basis of the W-RLF report received from the UE 100; however, this is not limiting. For example, the eNB 200 may determine that the W-RLF has occurred when it is not possible to receive, for a predetermined time, data to be received by the WLAN communication in the cellular/WLAN aggregation. Further, the eNB 200 may determine that the W-RLF has occurred when it is not possible to receive, for a predetermined time, an Ack of data to be received by the WLAN communication in the cellular/WLAN aggregation. Alternatively, the eNB 200 may determine that the W-RLF has occurred when it is not possible to receive data corresponding to an SN (Sequence Number) of a predetermined interval (for example, data corresponding to n to n+m of an SN value) from among data to be received by the WLAN communication in the cellular/WLAN aggregation. Further, the eNB 200 may determine that the W-RLF has occurred when it is not possible to receive the Ack of data corresponding to the SN of the predetermined interval. As such, even when the eNB 200 autonomously determines that the W-RLF has occurred, the eNB 200 is capable of executing the operations of the above-described sixth and ninth embodiments.

In each of the above-described embodiments, when the eNB 200 is not the cellular/WLAN collocated eNB 200, the AP 300 may have an aggregation entity (hereinafter, an "AG entity") that is an entity (layer/function unit) configured to control the cellular/WLAN aggregation. The eNB 200 is capable of exchanging predetermined information with the AG entity within the AP 300 by using a direct communication pathway. For example, in the above-described first and second modifications of the ninth embodiment, the eNB 200 may receive, from the AG entity, the W-RLF report, the WLAN Release Required, the WLAN Modification Required, etc., and may transmit, to the AG entity, a response to the W-RLF report, the WLAN Release Request, the WLAN Modification Request, the UE Context Release, a transmission request of downlink data, etc.

Alternatively, a node configured to control (a plurality of) the AP 300 (for example, AC: Access Controller) may have the AG entity. The eNB 200 is capable of exchanging predetermined information with the AG entity within the AC by using a direct communication pathway. Alternatively, the eNB 200 may have the AG entity. The eNB 200 may make the AG entity control the cellular/WLAN aggregation.

The operations according to each of the above-described embodiments are not limited to a case in which these operations are performed separately, and operations according to two or more embodiments may be combined and performed.

In each of the above-described embodiments, although the LTE system is described as an example of the cellular communication system, it is not limited to the LTE system, and the contents of the present application may be applied to a system other than the LTE system.

INDUSTRIAL APPLICABILITY

As described above, according to the embodiment-initiated user terminal and the base station, it is possible to realize efficient control when the cellular/WLAN aggregation is introduced, and thus, the user terminal and the base station are useful in the mobile communication field.

The invention claimed is:
1. A user terminal comprising:
a first transceiver configured to communicate with a first layer in a base station by a first communication, the base station included in a cellular communication network;
a second transceiver configured to communicate with an access point by a second communication, the access point included in a Wireless Local Area Network (WLAN) and connected to the base station via a backhaul;
a controller configured to transmit and/or receive downlink traffic through cellular/WLAN aggregation by using the first communication and the second communication, the downlink traffic divided into traffic for cellular communication network and traffic for WLAN at a second layer in the base station, the second layer being higher than the first layer; and wherein
the controller is further configured to transmit an uplink control signal through the cellular/WLAN aggregation by using the first communication and without using the second communication,
the first transceiver is further configured to notify the base station of a report regarding the second communication by the first communication,
the report indicates a failure in the second communication and includes a reason for the failure,
the reason includes a first reason, a second reason and a third reason,
the first reason relates to a radio environment in the second communication,
the second reason does not relate to the radio environment, and
the third reason relates to expiry of a timer on the WLAN communication, wherein
the first transceiver is further configured to receive a value of the timer from the base station, and
the first transceiver is further configured to notify the base station of the report upon the expiry of the timer when the report includes the reason including the third reason.
2. The user terminal according to claim 1, wherein
the first layer includes at least any one of physical layer, MAC (Medium Access Control) layer, and RLC (Radio Link Control) layer, and
the second layer includes at least a PDCP (Packet Data Convergence Protocol) layer.

3. The user terminal according to claim 1, wherein
the first reason includes at least any one of an interference state of a frequency band in the second communication and a received strength of a radio signal from the access point in the second communication, and
the second reason includes at least any one of a failure in transmission and reception in the second communication, and disconnection from the access point.

4. The user terminal according to claim 1, wherein
the report includes a measurement result regarding the second communication.

5. A communication control method comprising:
communicating with a first layer in a base station by a first communication, the base station included in a cellular communication network, the first communication notifying the base station of a report regarding a second communication;
communicating with an access point by the second communication, the access point included in a Wireless Local Area Network (WLAN) and connected to the base station via a backhaul;
transmitting and/or receiving downlink traffic through cellular/WLAN aggregation by using the first communication and the second communication, the downlink traffic divided into traffic for cellular communication network and traffic for WLAN at a second layer in the base station;
transmitting an uplink control signal through the cellular/WLAN aggregation by using the first communication and without using the second communication; and
wherein the report indicates a failure in the second communication and includes a reason for the failure, the reason includes a first reason, a second reason and a third reason,
the first reason relates to a radio environment in the second communication,
the second reason does not relate to the radio environment, and
the third reason relates to expiry of a timer on the WLAN communication, wherein
the communication control method further comprising
receiving a value of the timer from the base station, and
notifying the base station of the report upon the expiry of the timer when the report includes the reason including the third reason.

6. A chipset to be provided in a user terminal, comprising:
a processor and a memory coupled to the processor, the processor configured to:
communicate with a first layer in a base station by a first communication, the base station included in a cellular communication network, the first communication notifying the base station of a report regarding a second communication;
communicate with an access point by the second communication, the access point included in a Wireless Local Area Network (WLAN) and connected to the base station via a backhaul;
transmit and/or receive downlink traffic through cellular/WLAN aggregation by using the first communication and the second communication, the downlink traffic divided into traffic for cellular communication network and traffic for WLAN at a second layer in the base station;
transmit an uplink control signal through the cellular/WLAN aggregation by using the first communication and without using the second communication; and
wherein the report indicates a failure in the second communication and includes a reason for the failure, the reason includes a first reason, a second reason and a third reason,
the first reason relates to a radio environment in the second communication,
the second reason does not relate to the radio environment, and
the third reason relates to expiry of a timer on the WLAN communication, wherein
the processor is further configured to:
receive a value of the timer from the base station, and
notify the base station of the report upon the expiry of the timer when the report includes the reason including the third reason.

* * * * *